(12) United States Patent
Rai et al.

(10) Patent No.: US 10,929,854 B2
(45) Date of Patent: Feb. 23, 2021

(54) METHODS AND SYSTEMS FOR REAL-TIME IDENTIFICATION AND MITIGATION OF AGENT RISKS RELATING TO AML

(71) Applicant: The Western Union Company, Englewood, CO (US)

(72) Inventors: Manju Rai, Mumbai (IN); Murali Ravichandran, Mumbai (IN); Jacqueline Molnar, Lone Tree, CO (US); Noel Brandt, Highlands Ranch, CO (US); Niren Kinikar, Monmouth Junction, NJ (US)

(73) Assignee: The Western Union Company, Denver, CO (US)

( * ) Notice: Subject to any disclaimer, the term of this patent is extended or adjusted under 35 U.S.C. 154(b) by 1453 days.

(21) Appl. No.: 14/964,290

(22) Filed: Dec. 9, 2015

(65) Prior Publication Data

US 2017/0098221 A1    Apr. 6, 2017

Related U.S. Application Data

(60) Provisional application No. 62/236,453, filed on Oct. 2, 2015.

(51) Int. Cl.
*G06Q 40/00* (2012.01)
*H04W 12/08* (2009.01)
(Continued)

(52) U.S. Cl.
CPC ..... *G06Q 30/018* (2013.01); *G06Q 10/06395* (2013.01); *G06Q 40/00* (2013.01); *G06Q 50/2057* (2013.01); *H04W 12/08* (2013.01); *H04W 12/00503* (2019.01); *H04W 12/00505* (2019.01)

(58) Field of Classification Search
CPC ...... G06Q 10/06; G06Q 40/00; G06Q 30/018; H04W 12/005
See application file for complete search history.

(56) References Cited

U.S. PATENT DOCUMENTS

| 2004/0004663 A1* | 1/2004 | Kahn | H04N 1/00137 |
| | | | 348/207.1 |
| 2005/0055308 A1* | 3/2005 | Meyer | G06Q 10/0635 |
| | | | 705/38 |

(Continued)

OTHER PUBLICATIONS

EPA, "NPDES Compliance Inspection Manual", United States Environmental Protection Agency, EPA 305-X-04-001, Jul. 2004 (Year: 2004).*

(Continued)

*Primary Examiner* — Pan G Choy
(74) *Attorney, Agent, or Firm* — Kilpatrick Townsend & Stockton, LLP

(57) ABSTRACT

Systems and methods for identifying and mitigating non-compliances include determining an agent location of a money service business for review, obtaining a photograph and geographic coordinates of the agent location, and collecting field data at the agent location through a mobile application. Such information are sent from the mobile application to a central server of a third party vendor for a series of quality checks and stored at the central server. Such information may be used for further corrective action against the agent location reviewed.

20 Claims, 6 Drawing Sheets

(51) Int. Cl.
*G06Q 30/00* (2012.01)
*G06Q 10/06* (2012.01)
*G06Q 50/20* (2012.01)
*H04W 12/00* (2009.01)

(56) References Cited

U.S. PATENT DOCUMENTS

| | | | |
|---|---|---|---|
| 2006/0129587 A1* | 6/2006 | Renfro | G06F 21/604 |
| 2012/0041877 A1* | 2/2012 | Rao | G06Q 20/108 |
| | | | 705/43 |
| 2013/0093904 A1* | 4/2013 | Wagner | H04N 5/23206 |
| | | | 348/207.11 |
| 2013/0132275 A1* | 5/2013 | Enzaldo | G06Q 20/4016 |
| | | | 705/44 |
| 2013/0198039 A1* | 8/2013 | Sridharan | G06Q 30/0613 |
| | | | 705/26.44 |
| 2015/0154600 A1* | 6/2015 | Diehl | G06Q 20/4016 |
| | | | 705/39 |
| 2015/0350308 A1* | 12/2015 | Cosentino | H04W 12/001 |
| | | | 709/202 |
| 2016/0370954 A1* | 12/2016 | Burningham | G06Q 30/02 |

OTHER PUBLICATIONS

Elmira Bagheri Majdi, "Evaluation of Mobile Device Management Tools and Analysing Integration Models for Mobility Enterprise", Department of Computing Science, Umea University, Sweden, Jan. 2013. (Year: 2013).*

Western Union, "Moving Money for Better", Western Union Corporate Responsibility Report 2012 and 2013, (Year: 2013).*

* cited by examiner

US 10,929,854 B2

METHODS AND SYSTEMS FOR REAL-TIME IDENTIFICATION AND MITIGATION OF AGENT RISKS RELATING TO AML

CROSS-REFERENCE TO RELATED APPLICATIONS

This application claims priority to Provisional U.S. Patent Application No. 62/236,453 filed Oct. 2, 2015, entitled "METHODS AND SYSTEMS FOR IDENTIFICATION AND MITIGATION OF RISKS RELATING TO AML/KYC NON-COMPLIANCES," the entire disclosure of which is hereby incorporated by reference, for all purposes, as if fully set forth herein.

BACKGROUND OF THE INVENTION

Money service businesses ("MSBs") may include persons or organizations that provide a variety of financial products and services, including currency exchange; cashing checks; issuing, selling, and/or redeeming traveler's checks, money orders, or stored value cards; and transmitting money. When providing these products and services, MSBs must operate in compliance with regulatory controls, including anti-money laundering ("AML") rules, know-your-customer ("KYC") rules, suspicious activity and currency reporting ("SAR") rules, and/or various other identification, documentation, and record keeping rules, which may vary based on jurisdiction. To comply with these and other regulatory controls, MSBs operate under programs and procedures that may be based on risk assessments of the company's vulnerabilities to AML, KYC, and/or SAR non-compliance issues. Such programs and procedures are intended to prevent improper use of the products and services offered at the MSBs, such as illegal or improper money transfers including money laundering, payment for illicit products or services, and funding of terrorist or other criminal activity.

Many MSBs operate and distribute their financial products and services through a system of agents or vendors, which may include local and/or overseas counterparts that are also required to operate in compliance with regulatory controls. Typically, such agents and vendors operate under the supervision of a MSB or other entity, and utilize periodic training of their employees in an effort to ensure that such regulatory measures are in practice. For example, compliance tests or evaluations are conducted by officers physically visiting and checking agent and vendor locations. However, due to an ever-increasing number of agent and vendor locations, such approaches are hampered by various inefficiencies, increasing costs, and resource constraints. Further, such approaches largely rely on staff at the agent location to support the supervisory initiative and therefore are prone to bias and/or collusion. Finally, current trends toward increasing regulatory expectations require greater responsibility and control from the MSBs in conducting the compliance tests.

Issues affecting the traditional methods for conducting compliance tests may include a failure to validate presence of the staff, such as presence of the agents and officers, at their appropriate locations. Compliance data at the locations is often collected manually, which requires the staff to return to a base station and manually input their findings into a spreadsheet or other program at a central hub, often using computing resources of that central hub. Further, current compliance tests include evaluations that are susceptible to human subjectivity, including individual interpretation, bias, and/or errors which may skew an entire compliance report, particularly where risk-assessment questions overlap amongst various functions of the agents/officers. Furthermore, current evaluations lack real-time submission capabilities and/or real-time review, thereby contributing to delayed analysis and subsequent delays in the calibration of employee training and auditing needs. Scaling up the frequency and volume of reviews is also challenging because, in the existing infrastructure, it may entail greatly increased costs and human resource requirements.

Therefore, there is a need for improved infrastructure that facilitates the oversight, development, updating, and enforcement of compliance programs, particularly for financial institutions such as MSBs. Embodiments of the current invention may address these and other issues.

BRIEF SUMMARY OF THE INVENTION

This invention generally relates to systems and methods for reducing risks relating to financial products and services, and more specifically, to systems and methods for identifying and mitigating risks related to AML and/or KYC non-compliances.

In one aspect, the present disclosure provides a method for reviewing an agent location of a money service business ("MSB") in order to identify and mitigate risks due to non-compliance. The agent locations that require review may be identified by the MSB and passed on to a third party vendor. The method may include determining, at a central server, the agent location for review by a field task force ("FTF"). The review may be performed by a FTF of the third party vendor that is appointed by the MSB for physically visiting the agent location to conduct the review. The method may also include receiving, potentially in real-time by the central server, details of the review from a mobile application on a mobile device, including possibly a digital photograph and/or a confirmation of training received by the location staff. The digital photograph of the agent location (potentially with date and/or time stamp) may be captured by the mobile application during the review. The method may further include receiving, by the central server, geographic coordinates from the mobile application. The geographic coordinates may correspond to a location where the digital photograph was captured from during the review. In another aspect, the method may include receiving, by the central server, field data from the mobile application during the review. The field data may be obtained via a questionnaire provided by the mobile application and the questionnaire may predict non-compliances. During the visit, the FTF shall also train the agent location staff on the basic requirements of providing the service. In a different aspect, the method may include, upon receiving the field data at the central server, automatically prompting, by the central server, a quality control ("QC") consultant for input relating to a first quality check. During a first quality check, while the FTF is still in the vicinity of the location being reviewed, the QC may contact the FTF for any clarifications related to the inputs received from the FTF and accordingly update the review information. The first quality check may ensure consistency of the field data obtained during the review and identify any training needed for the agent location and/or FTF. The review may be considered to be complete only after the QC consultant ensures completeness of the review report. Upon receiving clearance from the QC consultant, the FTF may continue with his or her next review. The method may include, after performing the first quality check and/or post completion of the review, automatically prompting, at the central server, a chartered accountant for input relating to a second quality check (i.e., scheduling such an accountant for the second quality check and/or input). The second quality check may identify any training needed for the FTF and/or the QC consultant. The method may include recording, at the central server, information from the review including the digital photograph, geographic coordinates, field data collected during the review, input relating to the first quality check, and input relating to the second quality check.

Various embodiments of the method may include one or more of the following features. The central server may correspond to the third party vendor, and the central server may be in operative communication with a host system corresponding to the MSB. The method may include transmitting, by the central server, the information from the review to the host system corresponding to the MSB. The host system may analyze the information from the review to determine a subsequent action item for the agent location. The central server may evaluate each response in the questionnaire, and based on a scoring matrix provided by the MSB, assign a score. Subsequent action items may include implementing an employee training protocol (also referred to as an employee escalation protocol) such as suspension or training based on the final review score. In these or other embodiments, subsequent action items may also be based on a response to any particular given question or questions. Additionally, in some embodiments, subsequent action items may also be based on a combination of the final review score and a response to any particular given question or questions. The employee training protocol may be selected by the MSB to address non-compliances predicted by the field data obtained in the questionnaire. The method may include communicating, by the central server via a wireless network, with the mobile application on the mobile device to receive the information from the review while the mobile device is located remotely from the location of the central server. In another aspect, the method may include determining, at the central server, a plurality of agent locations for review, simultaneously conducting, at the central server, a plurality of reviews for the determined agent locations, and recording, at the central server, the plurality of reviews for the determined agent locations.

Further embodiments of the method may be contemplated to include one or more of the following features. The method may include determining, at the central server, the agent location for review based on instructions received from the MSB. The instructions may be based at least in part on risk and quality check analyses of previous reviews for the agent location. The method may include generating, by the central server, a score indicating a successful completion of the review based on completion of the first quality check. Successful completion may also be dependent on the answer to any particular given question or questions on the questionnaire. The score or other factor indicating the successful completion of the review may permits the FTF to proceed to review a different agent location. The method may include marking, by the central server, the review as closed based on the score or other factor. In another aspect, the method may include prompting, by the central server, the QC consultant for the input relating to the first quality check in real-time upon receiving the digital photograph, geographic coordinates, and field data. The method may include, based on the input relating to the first quality check, contacting, by the central server in real-time upon receiving the field data, the FTF for at least one of further clarification regarding the field data obtained via the questionnaire, correcting the field data obtained via the questionnaire, and providing training to the FTF responsible for conducting the review.

Further, the features of the method may include contacting the FTF by placing a call externally by a communication device or via a telecommunications network, to the mobile device of the FTF, whereby the call may be initiated by an input from the QC consultant at the central server. The method may include receiving, by the central server via a wireless communication network, a notification from the mobile application to escalate the review for the agent location. The notification to escalate the review may be based on a trigger identified by the mobile application. The method may include notifying a host system of the MSB to escalate the review, whereby escalating the review may prompt the MSB to determine subsequent actions to address the identified trigger. The questionnaire may include dichotomous questions having two possible response options. The two possible response options may include at least one of a yes/no response options, a true/false response options, and an agree/disagree response options. The questionnaire may include a plurality of questions, and each of the plurality of questions may be auto-generated in real-time by the mobile application, potentially based on responses received for preceding questions in the questionnaire.

Still further, each of the plurality of questions may be determined based on an objective risk matrix to predict and auto-load next questions in the questionnaire based on previous responses. The questionnaire may be stored at the mobile device having the mobile application such that the questionnaire is accessible with and without connectivity to a wireless communications network. The method may include assigning, by the central server, the review for a third quality check. The third quality check, this time possibly by an alternate resource, may include physically verifying the identified location independently and feeding results to the central server and validating, by the central server, the inputs from the review with a preceding review for the agent location to identify one or more inconsistencies. The method may include receiving, by the central server, feedback directed to a FTF training action from a host server of the MSB. The feedback may be based at least in part on the information from the review. The method may include notifying, by the central server, the mobile device of the FTF regarding the feedback directed to the FTF training action.

In another aspect of the present disclosure, a system for reviewing an agent location of a money service business ("MSB") in order to identify and mitigate risks due to non-compliances is provided. The system may include a mobile device having a mobile application configured to collect field data during a review of the agent location. The system may further include one or more processors and a memory communicatively coupled with and readable by the one or more processors. The memory may have stored therein processor-readable instructions that, when executed by the one or more processors, cause the one or more processors to perform one or more functions to review the agent location. For instance, the processor-readable instructions may cause the one or more processors to determine, at a central server, the agent location for review, whereby the review may be performed by a field task force ("FTF") of a third party vendor that is appointed by the MSB for physically visiting the agent location to conduct the review. The processor-readable instructions may cause the one or more processors to receive, by the central server, a digital photograph from a mobile application on a mobile device, whereby the digital photograph is captured by the mobile application at the agent location during the review. The processor-readable instructions may cause the one or more processors to receive, by the central server, geographic coordinates from the mobile application, whereby the geographic coordinates may correspond to a location where the digital photograph was captured from during the review.

In a further aspect, the processor-readable instructions may cause the one or more processors to receive, by the central server, field data from the mobile application during the review, whereby the field data may be obtained via a questionnaire provided by the mobile application, further where the questionnaire may predict non-compliances. The processor-readable instructions may cause the one or more processors to, upon receiving the field data at the central server, automatically prompt, by the central server, a quality control ("QC") consultant for input relating to a first quality check. The first quality check may ensure consistency of the field data obtained during the review and identify any training needed for the agent location. The processor-readable instructions may cause the one or more processors to, after performing the first quality check, automatically schedule/prompt, at the central server, a chartered accountant for input relating to a second quality check. The second quality check may identify any training needed for at least one of the FTF and the QC consultant. The processor-readable instructions may cause the one or more processors to record, at the central server, information from the review including the digital photograph, geographic coordinates, field data collected during the review, input relating to the first quality check, and input relating to the second quality check.

In yet another aspect of the present disclosure, a computer-readable medium has stored thereon a series of instructions which, when executed by a processor, cause the processor to review an agent location of a money service business ("MSB") in order to identify and mitigate non-compliances. The series of instructions may include determining, at a central server, the agent location for review. The review may be performed by a field task force ("FTF") of a third party vendor that is appointed by the MSB for physically visiting the agent location to conduct the review. The series of instructions may include receiving, by the central server, a digital photograph from a mobile application on a mobile device. The digital photograph may be captured by the mobile application at the agent location during the review. The series of instructions may include receiving, by the central server, geographic coordinates from the mobile application. The geographic coordinates may correspond to a location where the digital photograph was captured from during the review.

Further, the series of instructions may include receiving, by the central server, field data from the mobile application during the review. The field data may be obtained via a questionnaire provided by the mobile application, whereby the questionnaire may predict non-compliances. The series of instructions may include, upon receiving the field data at the central server, automatically prompting, by the central server, a quality control ("QC") consultant for input relating to a first quality check. The first quality check may ensure consistency of the field data obtained during the review and identify any training needed for the agent location. The series of instructions may include, after performing the first quality check, automatically scheduling/prompting, at the central server, a chartered accountant for input relating to a second quality check. A "chartered accountant," as used herein, may include an actual chartered accountant in such jurisdictions as they exist, or otherwise by a qualified representative of the MSB, or other designated party. The second quality check may identify any training needed for at least one of the FTF and the QC consultant. The series of instructions may include recording, at the central server, information from the review including the digital photograph, geographic coordinates, field data collected during the review, input relating to the first quality check, and input relating to the second quality check.

Figure 1:
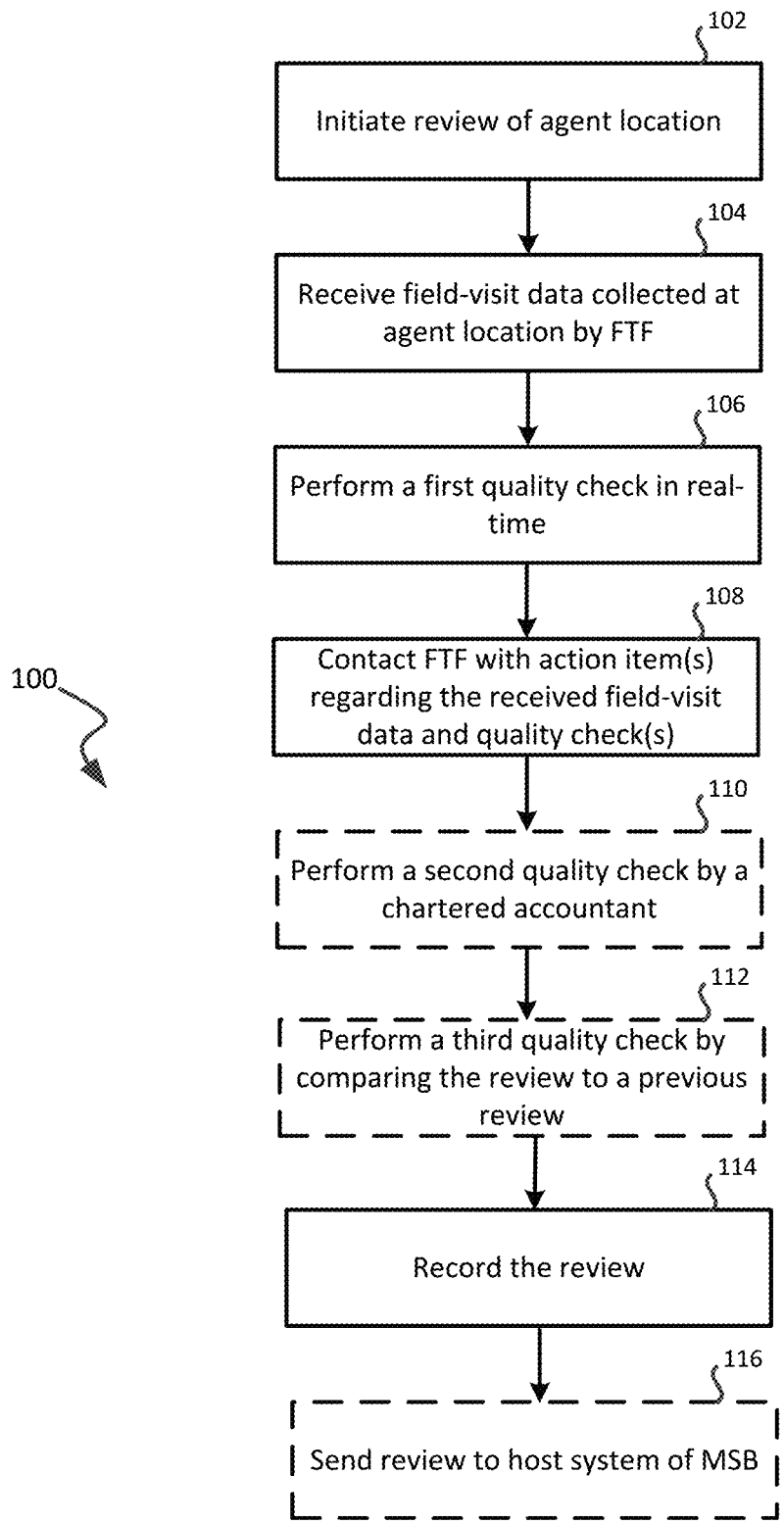
FIG. 1 shows an example method for identifying and mitigating risks relating to non-compliances.

It is noted that any of the elements and/or steps provided in the block diagrams, flow diagrams, method diagrams, and other illustrations of the figures may be optional, replaced, and/or include additional components, such as combined and/or replaced with other elements and/or steps from other figures and text provided herein. Various embodiments of the present invention are discussed below, and various combinations or modifications thereof may be contemplated.

DETAILED DESCRIPTION OF THE INVENTION

In the following description, for the purposes of explanation, numerous specific details are set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Further, specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "machine-readable medium" includes, but is not limited to, portable or fixed storage devices, optical storage devices, wireless channels and various other mediums capable of storing, containing or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

In general, the systems and methods described herein provide for identification and mitigation of risks that are related to non-compliance of AML, KYC, and other regulatory and/or operational controls. In some examples discussed herein, the systems and methods employ a mobile application, such as an Android™ or iOS™ mobile application, which may include or otherwise utilize an objective questionnaire, a risk scoring matrix, and/or a case escalation matrix. In some embodiments, some or all logic/functionality may be performed at a remote server such as those discussed herein. It is contemplated that the systems and methods described herein may provide for a real-time evaluation process that is objective and allows for subsequent remediation and/or exclusion measures, if any, to be promptly implemented at an agent location being investigated. In practice, the systems and methods may be implemented to conduct compliance evaluations for a multitude of third party agents and/or representatives that form a service network of a money service business ("MSB"). Merely by way of example, a MSB such as WESTERN UNION, may use the systems and methods presented herein to perform evaluations and implement certain actions based on the evaluations, individually and/or collectively, simultaneously and/or sequentially, across a plurality of agent locations. In some cases, the agent locations may be highly dispersed across a large geographical area, such as, merely by way of example, the thousands of agent locations that provide WESTERN UNION operations that are distributed throughout India. Through implementation of the systems and methods described herein, the MSB may effectively and objectively ensure that its internal operations comply with both jurisdiction-based rules, such as India or other jurisdiction specific standards, world-wide governing controls, such as the AML/KYC rules, and/or meet operational guidelines such as Western Union expected standards and guidelines.

As an example implementation, a MSB, such as Western Union Financial Services Inc. ("WUFSI") may be authorized to provide money transfer services for inbound and outbound cross border money transactions, such as transmitting money from customer to customer globally. Such authorizations may be given to the MSB by local institutions in any country or jurisdiction where the MSB intends to operate. Merely by way of example, WUFSI operating in India may be authorized by The Reserve Bank of India ("RBI") under various laws, such as The Payments and Settlements Systems Act, 2007 ("PSA"), among other certifications, to provide money transfer services and may be subject to various terms and conditions detailed by the RBI approval. Consequently, in this example, with the RBI approval, WUFSI in India may be regarded as the "Overseas Principal" under a money transfer service scheme ("MTSS") and also as a "Payment System Operator" under the PSA.

In some examples, the MSB may have a plurality of third parties that distribute the financial goods and services provided by the MSB. Merely way by of example, WUFSI operations in India may include a service network that comprises one or more MTSS representatives throughout India. In such a specific implementation, WUFSI operations in India currently utilize nine MTSS representatives, including India Post, State Bank of India, Andhra Bank, Karnataka Bank, Paul Merchants Limited, YourFirst Money Express Private Limited, Transcorp International Limited, Weizmann Forex Limited, and Wall Street Finance Limited. Such representatives may offer WUFSI-branded financial products and services through their own locations and/or sub-representative locations (in this example, throughout India). Such locations and/or sub-representative locations may include agent locations, kiosks, webpage and/or software applications, and other tools and mechanisms.

In the above example, while operating in India, WUFSI is required to adhere to terms and conditions detailed in the RBI authorization, and more specifically in the Certificate of Authorization portion stipulated by the RBI. Under the Certificate of Authorization, WUFSI is responsible and accountable for the activities of its network of agents, sub-agents, representatives, and sub-representatives distributed throughout India. Accordingly, WUFSI runs a highly regulated business that includes regularly training its network on the intricate rules of the regulatory controls and regularly auditing the network to ensure that the rules are being followed. Therefore, close and continuous oversight of the agents and representatives is a requirement for WUFSI acting as the Overseas Principal, whereby WUFSI is responsible for the activities of the agents and sub-agents in India. It is noted that although WUFSI in India operations are exemplified, any MSB operating in any country may encounter similar requirements and responsibilities and/or wish to put in place similar controls.

Such networks of MSBs may include hundreds of thousands of agents and representatives that are highly distributed and continuously being established throughout a geographical area. For example, WUFSI may have over 105,000 locations in its ever-growing network throughout India. Given the large number of locations and mixed class of trade in the network, a MSB such as WUFSI may appoint a third party vendor to facilitate conducting reviews on the agent locations. In other examples, the MSB may conduct such reviews on their own. With the present systems and methods discussed herein, the MSB such as WUFSI may implement the third party review process with a set risk questionnaire that is provided, approved, and/or otherwise determined by the MSB. In some embodiments, the level of quality control employed by the third party may be determined by the MSB or any other party discussed herein. Further, with the systems and methods discussed herein, the MSB may implement a scoring mechanism that is used for evaluating a risk level of the reviewed agent location based on the questionnaire feedback, so that appropriate consequent actions, if any, may be taken, either immediately (near real-time) or at pre-designated time periods. Furthermore, through the systems and methods discussed herein, a sufficient trail may be created for regulatory bodies, such as the RBI and/or other law enforcement agencies. Such trails may provide evidence demonstrating that: 1) a correct location was visited during the review; 2) consistent and objective approach to the regulatory program was implemented; 3) appropriate action(s) per the defined scoring matrix and escalation policy(s) were implemented; 4) strong quality check procedures were applied; 5) the MSB's compliance with regulatory expectations have been met.

It is noted that in some examples, location review procedures disclosed herein may require staff of the third party vendor to travel to a large number of agent locations to conduct the reviews. In the above example, the third party vendor may send the staff, also referred to herein as the "field task force," to remote locations throughout India where the agents and sub-agents are located, e.g. spread over a large geographical area of approximately 3,287,240 sq. km. In that case, physical verification by the MSB, such as by employees of the MSB, of the agent training, reviews, and/or any actions performed by the MSB-appointed field task force may be prohibitive. For example, with previous methods, whereby MSB in-house staff would physically visit the agent locations, only about 1% to 3% of the agent locations could be covered due to the increased location numbers, cost and resource constraints. In another aspect, collusion between the agent or sub-agent and field task force may lend to inflated achievements of set targets. In summary, it is contemplated that the present systems and methods disclosed herein may provide benefits that address such issues and provide related advantages.

For example, the present systems and methods disclosed herein may verify that the staff of the third party vendor is physically present at the agent location being reviewed, and that such staff is imparting necessary training for employees and collecting adequate data for the MSB to ascertain the risk level and/or other required actions and tasks. The present systems and methods may provide the feedback and quality of training to the MSB in real-time, which may mitigate tampering that might arise from collusion between the third party vendor and the agent or sub-agent, e.g. inflating achievement of targets. The systems and methods disclosed herein may further minimize subjective human bias and error from the agents, sub-agents, and/or the field task force by utilizing an objective questionnaire, which may lead to a more accurate prediction of risk. The procedures may also allow for confirmation of physical presence of a location and provide comfort that there are no "ghost" locations processing transactions.

Additionally and/or alternatively, the systems and methods disclosed herein may employ a plurality of unique quality checks to validate the agent location review process. Further, it is worthy to note that in some examples of the systems and methods disclosed herein, the onsite reviews conducted by the staff of the third party may be further validated by a separate and independent personnel making another physical visit and conducting real-time determination that the field visit has been properly completed. In further examples, real-time evaluation of the reviews conducted by the third party vendor may allow the MSB to respond to suspicious or improper activities in real-time by suspending or terminating operations, thereby preventing potential offences and/or contravention. In another aspect, real-time calibration of any weak locations or operations within the network allows the MSB to track and more efficiently deploy training and/or auditing resources.

Apart from adhering to local compliance requirements, the present systems and methods disclosed herein may allow the MSB to better mitigate the risk of their products and services being used for unlawful purposes, such as money laundering, fraud, and terrorist financing, and also reduce instances of fines or penalties as a result of their network not following procedures correctly. Not only do such measures protect the MSB, but further, contribute to the protection of the global financial system against potential abuses. In another example, the systems and methods disclosed herein may be implemented globally as a global agent oversight program through similar solutions or in-house solutions. Other benefits and implementations are possible.

According to some aspects of the present disclosure, the staff of the third party vendor uses a wireless application protocol ("WAP") enabled wireless communication device to collect information, such as a general packet radio service ("GPRS") device, e.g. an Android-based tablet or cell phone. Information may be collected from the staff via a questionnaire format that is created or tailored by a main user or applicant conducting the review, such as the MSB. The data may be collected through a mobile application that is specifically developed for the purpose of conducting reviews in complying with regulatory controls and/or internal requirements. The questionnaire may either be implemented completely or be based on a predictive risk methodology whereby a series of questions are generated and/or predicted in real-time. In some examples, the questionnaire selects subsequent questions in real-time based on answers received in preceding questions of the questionnaire during a same session or from a different review session. The real-time nature of such predictive aspects of the questionnaire and response feed may enable the systems and methods disclosed herein to better assess the scope and extent of any risks identified.

It is contemplated that the mobile application, the review of sample documents, and/or the responses to questions, allow for proper assessment by the MSB of the agent location. The objective responses fed into the mobile device may be utilized by the MSB to determine appropriate next actions based on a risk-matrix, which aids the MSB in deciding whether further probe and/or review of the agent location is required. With the systems and methods disclosed herein, such actions may be determined with little to no impact from any subjective interpretation of the respondents and/or the third party vendor conducting the audit by way of objective questionnaire. Further, responses to the individual questions in the questionnaire may be utilized to create and provide focused training to the employees at the agent location to address any particular deficiencies identified in the review process. Such focused training may be provided by the MSB, by the staff of the third party vendor reviewing the agent location, and/or based on the risk determined, by the staff of the agent who has been arranged to provide the MSB service at a location and/or in some cases, based on the risk determined, by the employees of the MSB.

In another aspect, data or information collected via the questionnaire may pass through a scoring matrix, which may be developed and/or otherwise tailored in-house by the applicant, such as the MSB. The scoring matrix may provide a real-time computation of the deficiencies, attendant risk, and/or remedial actions needed. Subsequent appropriate action(s) may be triggered automatically by the systems and methods disclosed herein. In some examples, subsequent actions may include generating, by the systems and methods disclosed herein, emails based on the questionnaire results and/or scoring matrix to notify stakeholders. Such emails and other actions may be performed by a central system, such as server of the third party vendor or a host system of the MSB, potentially whichever receives and hosts all information relevant for the agent location reviews and notifications. Additional and/or alternative actions may be required by the central server and/or host system to target and mitigate any risks of AML/KYC non-compliances, and/or possible or potential threats to maintaining compliance thereof.

In a further aspect, the systems and methods disclosed herein comprise built-in controls that allow for geo-tagging of an agent location being reviewed. In this way, information and evidence of where the review was conducted may be recorded. In some examples, such information is automatically embedded by the mobile application in the data that is collected by the third party vendor's staff via the questionnaire and is communicated in real-time or in an offline mode to the third party vendor and/or MSB's server or host system. In another example, such location data may also be embedded by the mobile application to a photograph taken via the mobile application of the location being reviewed. The mobile application may upload or otherwise communicate the geo-tagged coordinates and/or captured photograph to the host system and/or vendor's server. In some aspects, the mobile application may add the location, date, and time stamp of the photograph, in addition to scanning all or a portion of the questionnaire, such as a page of the questionnaire where the third party vendor's staff signs off on the review. The field staff may not be able to externally or otherwise capture the geo-coordinates or photograph and communicate to the central server or the host server. It is contemplated that such measures may be taken to confirm the presence of the third party vendor's staff at the correct agent location. The geo-tagged co-ordinates may be used for validating subsequent review of the same location.

In some examples, any data that is collected by the third party vendor's staff via the mobile application may be streamed online to a vendor server and/or MSB host system. In one example, the information is streamed to the vendor's server, where a quality control ("QC") consultant reviews such information as it is collected by the field task force, immediately after it is collected by the field task force, and/or otherwise. If any inconsistencies are discovered by the QC consultant, the QC consultant may contact, in real-time, the third party vendor's staff for additional information. For instance, the QC consultant may contact the third party vendor's staff via the mobile application and/or mobile device. Where necessary, responses to the questionnaire and/or any portion of the risk assessment may be corrected by the QC consultant based on his or her interactions with the third party vendor's staff. An audit log may be maintained by the mobile application, server and/or host system for any such changes. In some aspects, once the QC consultant approves the information collected by the third party vendor staff, the information is stored in the server and/or host system and the review may be marked as completed and/or scored. Furthermore, this setup may be used to provide regular training to the FTF and thus ensure effectiveness of the review. Such training could be through streaming of tips related to specific topics of the review or testing the knowledge of the FTF by asking a direct question or a combination of direct questions related to the review activity. Where such tests are conducted, the FTF may be required to answer each and all of the questions for which input is required and may be allowed to continue the review once all questions are correctly answered or after a follow-up training by the third party team (which may be conducted by the QC consultant, a training manager, a supervisor, and/or any other person within the third party team).

It is worthy to note that the present systems and methods may utilize any of a variety of quality controls to help confirm that the information received is complete and/or accurate. In the event that the equipment, such as the mobile device and/or application, is not working, the review may be marked as an exception case. In that case, the third party vendor's staff may manually collect the information based on a backup/physical questionnaire that is designated for such exception cases, and/or forward results of the questionnaire to the vendor's server at a later time, either through mail or through a WEB application that allows capture of the information relevant to the questionnaire. In another aspect, if the mobile device and/or application is working, but there is no network or telecom connectivity, data and/or responses to the questionnaire may be collected in an offline mode. Additionally and/or alternatively, data may be manually collected. Any such data may then be transmitted automatically by the mobile device and/or application when connectivity is determined by the device to be available. In an aspect, the questionnaire, and/or the backup questionnaire, may be accessed by the mobile device and/or the application regardless of network connectivity status, e.g. the questionnaire may be built-in to the mobile application and/or stored on the mobile device itself.

Upon receiving such uploaded information, the quality check process may be initiated by the QC consultant. In some situations, the QC procedure may require the third party vendor's staff to return to the agent location to collect additional information for evaluation. In some cases where the QC consultant determines that the agent location has to be re-reviewed, the original review may be canceled on the system and/or replaced with a new review. Such changes may be recorded in an audit log. In another aspect, a supervisor or another independent staff of the third party vendor's staff may conduct a 10% quality check, whereby 10% of all of the reviews and responses are systemically verified with the previous or original reviews for the particular agent location to identify any inconsistencies. In yet another aspect, a chartered accountant may conduct a quality check of every review for consistency and may help identify any training needed for the third party vendor's staff and/or the QC consultant. In cases where a physical form may be utilized by the third party vendor's staff for collecting data on the agent location, such physical forms may be scanned and uploaded in the MSB's host system. In yet another aspect, the electronic questionnaire and responses, along with the photograph(s) taken at the agent location, geo-tagging information, and/or quality check updates may be directly formatted, by the systems and methods disclosed herein, to a PDF and/or HTML file. Such files may be uploaded and/or otherwise stored at the MSB's host system. Other formatting and examples are possible.

In general, the present systems and methods disclosed herein provide various benefits for the MSB, including the capability to validate the presence of the vendor's third party staff at the correct agent location. Quality control of the reviews is enhanced with real-time technology and communications between the vendor's third party staff, the QC consultant, and/or the MSB host system. Evaluation of the agent location is based on an objective matrix that ensures consistency in evaluations across a multitude of agent locations, as well as for the same agent location being re-evaluated. The objective risk matrix may work in concert with the predictive risk questionnaire to possibly auto load next questions based on previous responses. Real-time feed of the objective results allows for calibration of training and audit needs, thereby reducing risks and allowing weak spots to be identified and focused upon for improvement. Scaling up the number of objective, quality reviews of agent locations is possible. In an aspect, the systems and methods described herein may allow for an increased frequency of reviews of agent locations to be conducted and quality checked than before. On-spot remediation, suspension, and/or termination of agent locations based on the review of the third party vendor's staff and/or subsequent quality check(s) is possible. Collection of sample transaction information and/or physical evidence through the questionnaire may be used to validate whether the third party vendor's staff visited the correct location, and/or to confirm an address of the agent location as listed in the MSB's records. The MSBs may initiate their own sample checks periodically that may be used to validate the efficacy of the program/review process, to obtain feedback to correct/enhance the program/process or to provide feedback/training to the third party vendor management/staff.

As described above and further in the succeeding paragraphs, the present systems and methods disclosed herein may aid MSBs in supervising compliance of their network of agents and representatives with AML/KYC policies and procedures. In some aspects, the systems and methods discussed herein may aid the MSBs in keeping up-to-date with any changes or updates with the laws and regulations, business operation changes, and/or new risks identified, and to implement actions that address and/or result from such changes throughout their network(s) in a more timely and efficient manner. In another aspect, the AML/KYC programs set by the MSB may be updated to match changing business methods of the MSB and implemented with immediacy using the systems and methods discussed herein. Further, identification of non-compliances by the review process discussed herein may permit the MSB to apply any disciplinary actions when employee non-compliance is detected. In another aspect, the systems and methods discussed herein may help ensure periodic retraining of the agent locations and/or the field task force, in part by way of the real-time evaluations and quality checks discussed herein. Further, records of employee attendance and training may be logged by the systems and methods discussed herein, such as the MSB host system, and/or referenced in the questionnaire and risk evaluations. Generally, it is contemplated that the present system and methods disclosed herein ensures that the AML/KYC program is implemented and operating and that problems are addressed immediately. Any non-compliance, such as detecting and deterring improper uses of the products and services offered by the MSB, may be identified, flagged, and/or thwarted immediately in real-time through training or through MSB initiated actions post-review.

Turning now to FIG. 1, an example method 100 for identifying and mitigating risks relating to AML/KYC non-compliances is shown. The method 100 may be performed by the third party vendor system, such as a central server thereof. In other aspects, the method 100 may be performed by a mobile application, which may be herein referred to as a compliance review mobile application that is provided on a mobile device utilized by the FTF of the third party vendor system. In yet another example, the method 100 is performed by the MSB's host system. In still another example, the method 100 may be performed by a combination of the third party vendor system's central server, the compliance review mobile application, and/or the MSB's host system. The method 100 may aid the MSB in meeting supervisory requirements and promote the oversight, development, update, and enforcement of such AML/KYC programs throughout the MSB's network. In one example, the method 100 is performed by a central server of a third party vendor system, whereby the central server is in wireless communication with the mobile device that is carried out to an agent location by the FTF for conducting the review. It is noted that any of the methods described herein may include additional steps and that any of the steps shown may be optional.

As shown in FIG. 1, the method 100 may include initiating a review of the agent location (step 102). In some examples, initiating the review may include determining the agent location to be reviewed. The agent location may be determined by the MSB host system, which utilizes a volume-risk based matrix or any other risk triggers to identify locations that should be reviewed. Such information and/or determined agent locations may be passed from the host system to the third party vendor's central server. It is noted that the third party vendor, also known as the external vendor, is appointed by the MSB for physically visiting the agent location, conducting the review and providing basic training. It is also noted that in some cases, reviews of agent locations may be conducted without indication or prior notification to the agent locations. In another aspect, the MSB and/or the third party vendor may determine a routing for conducting a sequence of reviews at a plurality of agent locations that should be covered. For example, the third party vendor may receive indication of which agent locations to review from the MSB, assign one or more of the determined agent locations to a FTF staff or team, and determine a best route for conducting the sequence of reviews. Such best routes may be determined based on a ranking of urgency for the review in comparison to reviews of other agent locations, a fastest travel route, a most cost-effective travel route, and/or a combination of such factors, among others.

In one example, the central server of the third party vendor determines the agent location for review based on the information received from the MSB's host system. For instance, the central server may determine the agent location for review based on instructions received from the MSB, whereby the instructions are based at least in part on a risk and quality check analyses of previous reviews for the agent location. In a further aspect, the central server may determine a plurality of agent locations for review. The plurality of agent locations may be identified by the MSB and/or reviewed simultaneously, such that the third party vendor performs multiple reviews using multiple FTF. It is contemplated that central server and/or the host system may be sufficient to handle large volumes of reviews being conducted, and to record such plurality of reviews for the determined locations as documentation.

Referring again to FIG. 1, the method 100 may include receiving field-visit data collected at the agent location by the FTF (step 104). Such field-visit data may be collected via the mobile application on the mobile device and transmitted to the central server, and/or to the host system, via a wireless network. It is contemplated that the mobile device may be located remotely from a location of the central server and/or the host system, e.g. at the agent location. Such field data may include a variety of data collected by the FTF and/or required by the mobile application, such as responses to an objective questionnaire of the mobile application, one or more digital photographs corresponding to the agent location, and/or one or more sets of geographic coordinates corresponding to the agent location.

For example, the central server may receive the field data that is obtained via the questionnaire provided by the mobile application. In some aspects, the questionnaire evaluates (and potentially predicts) non-compliance of the agent location and/or risks thereof. In some cases, the FTF may indicate that a location in the MSBs records may actually not be performing the service, is closed temporarily or permanently, and/or is otherwise unable to proceed with the audit. In such cases the mobile application may not prompt the full questionnaire and may only prompt for other validations such as obtaining a photograph, geo-coordinates, etc. allowing the MSB, if necessary to take suitable action. In one example, the questionnaire comprises dichotomous questions that each has two possible response options for selection by the FTF. Such response options per question may include a yes or no response option, a true or false response option, an agree or disagree response option, and/or an answer A or answer B response option, among others. Some questions may have an additional option that indicates whether the said question is applicable for the review/location. The questionnaire may comprise a variety of such response options. In another aspect, each of the plurality of questions may be auto-generated in real-time by the mobile application as the FTF is inputting responses to the questionnaire. For instance, the mobile application may determine a next question for the questionnaire based on one or more responses received for one or more preceding questions in the questionnaire. In other embodiments, all available questions may be asked. In some embodiments, each of the plurality of questions may be determined based on an objective risk matrix that is utilized to estimate risks and to auto-load next questions in the questionnaire based on previous responses. In some aspects, it is contemplated that the questionnaire is stored at the mobile device having the mobile application such that it is accessible with and without connectivity to a wireless communications network. For instance, if no wireless connectivity is available during the review, the questionnaire may be configured to receive and store the questionnaire responses until wireless connectivity is detected, whereupon the responses may be sent to the central server and/or the host system.

It is contemplated that the questionnaire is configured to identify and/or further provide information on whether an agent location's staff is trained on requirements for processing a money transfer transaction. Such requirements may include procedural steps that are implemented by the MSB to ensure that its agent location staff operates in compliance with rules and regulations. For instance, the questionnaire may identify whether the agent location's staff is aware of what needs to be done for certain scenarios, whether transactions below an X amount may be paid in cash, which documentation from a client is allowable as verification for a product and/or service, and so on, to check if the staff is following the MSB's compliance programs and procedures. In one example, the MSB host system may receive the completed questionnaire and review specific questions to determine if any further review is required. For example, if an answer to a question is marked as "no", however the MSB expects the answer to be "yes", the MSB may perform an analysis to review the agent location further regarding issues related to that specific question. In another aspect, the MSB may review a plurality of agent location(s) that are identified as having answered "no" for a common specific question in their reviews. It is contemplated that such further probing may be automated by the host system and/or be conducted by in-house staff at the MSB.

Further, it is contemplated that the questionnaire is objective and predictive. More specifically, the questionnaire is configured to predict risk based on how questions are being answered. By offering dichotomous questions, such as only answering yes or no, human error and/or subjectivity may be reduced and/or mitigated. Further, efficiency of the review may be increased while still collecting reliable data. In some examples, a scoring methodology is utilized in the questionnaire by the mobile application to predict and/or categorize risks. For instance, based on the responses received in the questionnaire, the mobile application may categorize the review and/or the agent location as a KYC bucket risk, an AML bucket risk, a transaction monitoring bucket risk, and/or other types of risks desired to be identified by the MSB. Such categorizations, along with any of the other types of field data collected during the review, may be communicated with the MSB's host server and/or with the central server and utilized to determine subsequent actions in real-time for the agent location. Merely by way of example, the MSB may determine, based on the risk identification and/or categorization, to instantaneously, or in a pre-determined schedule, shut down the agent location, temporarily or permanently, if the risk level exceeds a maximum acceptable level. In another example, the MSB and/or the third party vendor's central server or support staff thereof may initiate training measures in real-time at the agent location to remediate any issues. In these ways, it is contemplated that the field data collected via the questionnaire may trigger follow-up measures from the MSB and/or the third party vendor in real-time, e.g. upon receiving and/or shortly after receiving the field data from the mobile application while the FTF is still at the agent location and available to help implement such follow-up measures. Other examples are possible.

In another example, the field-visit data may include a digital photograph of the agent location being reviewed, whereby the digital photograph is taken at the agent location via the mobile application by the FTF during the review. The digital photograph may be wirelessly transmitted to the central server of the third party vendor and/or to the MSB host system. In some examples, the digital photograph is wireless transmitted by the mobile application upon completion of the review. In another aspect, the digital photograph is captured via the mobile application upon completion of the questionnaire. A plurality of photographs may be taken of the agent location, such as upon commencement of the review, in the middle of the review, and at an end of the review, which may include completing the questionnaire. In some aspects, the digital photograph may be automatically captured and/or prompted for capture by the third party vendor via the central system. For example, the central system may wirelessly signal the mobile application to cause the mobile application to automatically capture a photograph and/or transmit the photograph to the central server for recording and/or subsequent analysis. It is contemplated that the digital photographs may be utilized to confirm visits made by the FTF, i.e. the FTF is physically on-site and at a correct agent location. The digital photograph may be transmitted along with the review information, such as the questionnaire responses, to the central server and/or the host system.

In another aspect, a date and time stamp may be recorded on the digital photograph. In some examples, while any photo may be taken by a camera on the mobile device and/or the tablet utilized by the FTF for review, such photos may be prohibited from being merged with the mobile application or uploaded to the central server and/or host system. In other words, such photos that are not taken via the mobile application may be prevented, by the mobile application, from being associated for the review by preventing them from being uploaded and/or streamed online to the central server and/or the host system. This may prevent misuse of the mobile application, e.g. prevent the FTF from uploading a photo taken from a previous trip to the agent location as evidence of the current visit to the agent location. In still other examples, the FTF may conduct the review with physical forms, which the mobile application may capture via the camera and/or otherwise scan and stream to the central server and/or host system. In still another aspect, a staff member of the agent location may confirm that he or she is receiving training from the FTF by attaching his or her picture, which may also be captured by the mobile application, to the data questionnaire. In this way, further verification of the FTF's attendance at the correct location and performance of appropriate training tasks may be provided. Other examples are possible. For instance, the mobile application may receive confirmation of the training performed and/or agent location being evaluated by receiving a seal that may be affixed by a staff, such as an agent at the agent location, and/or by the FTF, to the questionnaire and/or the digital photograph. This may provide confirmation that the FTF visited the correct agent location and/or that proper training was provided for the correct agent.

In yet another example, the field-visit data may include geographic coordinates captured by the mobile application through a global positioning system ("GPS") tracker on the mobile device. For instance, the coordinates may correspond to a location where the digital photograph is captured from during the review. In that case, it is contemplated that the location is in close proximity and/or at a set of geographic coordinates corresponding to the agent location being reviewed. The captured geographic coordinates may be transmitted from the mobile application to the central server and/or host system for verification of the FTF's location. In an aspect, the mobile application may geo-tag any digital photograph taken via the mobile application to mark an attendance of the FTF being online and/or being at the correct location. In another aspect, the mobile application may capture a set of geographic coordinates in periodic intervals to track the FTF movements and/or route. In yet another aspect, the mobile application may capture the geographic coordinates upon receiving a prompt from the central server and/or the host system. In that case, the mobile application may automatically capture and transmit the geographic coordinates without any input from the FTF. The geographic coordinates may further be used for validation for subsequent visits of the FTF. For instance, a previous set of geographic coordinates may be compared, by the mobile application, the central server, and/or the host system, with a current set geographic coordinate corresponding to a currently active review to ensure that the FTF is at the correct location. These geo-coordinates may have other uses such as pin-pointing on a map a location providing the MSB service to a potential customer, to another reviewer of the third party, and/or to a staff of the MSB.

As shown in FIG. 1, the method 100 may include performing a first quality check in real-time (step 106). For instance, upon receiving the field data at the central server, the method 100 may include automatically prompting, by the central server, a quality control ("QC") consultant for input relating to a first quality check. The first quality check may be configured to ensure consistency of the field data obtained during the review and/or identify any training needed for the agent location based on the field data collected. The central server may prompt the QC consultant for input relating to the first quality check in real-time, that is, upon receiving the digital photograph, the geographic coordinates, and/or the field data from the mobile application. In another example, the host system may perform the first quality check. It is noted that a real-time first quality check may provide the third party vendor with an opportunity to train the FTF while the FTF is on-site at the agent location, and/or to train the staff at the agent location with immediacy. In some cases, all or a portion of the first quality check may be automated. For instance, the central server may automatically identify issues related to the collected field data and suggest various training programs to be imparted and/or further clarification that may be required. Such suggestions may be communicated to the QC consultant, such as via a display screen in operative communication with the central server. In that case, the QC consultant may perform subsequent actions, such as contacting the FTF in real-time.

As further shown in FIG. 1, the method 100 may include contacting the FTF with action item(s), if any, regarding the received field-visit data and the first quality check, among other possible quality checks described further below (step 108). For example, based on the input relating to the first quality check, the method 100 may include contacting, by the central server in real-time upon receiving the field data and/or conducting the first quality check, the FTF via the mobile device, and/or more specifically the mobile application, of the FTF. Merely by way of example, QC consultant and/or the central server may seek for input from the FTF for at least one of further clarification regarding the field data obtained via the questionnaire, correcting the field data obtained via the questionnaire, and/or providing training to the FTF responsible for conducting the review. Contacting the FTF may include placing a call, from the central server or externally by a communication device, via a telecommunications network, to the mobile device of the FTF, whereby the call may be initiated by an input from the QC consultant at the central server. In another aspect, the field data questionnaire and/or other portions of the review may be altered and/or otherwise changed by input to the central server from the QC consultant without contacting the FTF.

In still other examples, the method 100 may include receiving, by the central server via a wireless communication network, a notification from the mobile application to escalate the review for the agent location. The notification to escalate the review may be based on a trigger identified by the mobile application, such as an unavailable agent location for review, an incomplete review, and/or other issues which may be defined originally by the MSB as worthy of escalation. In that case, the method 100 may include notifying, by the central server, and/or the host system of the MSB to escalate the review, whereby escalating the review may prompt the MSB to determine any subsequent actions to address the identified trigger. Such actions may include establishing direct contact between the MSB and the agent location, suspending an activity of the agent location, closing the agent location, establishing contact between the MSB and the third party vendor, and/or identifying training required for the third party vendor and/or FTF. Other examples are possible.

Still referring to FIG. 1, the method 100 may include performing a second quality check. The second quality check may be performed by a chartered accountant (step 110). It is noted that in some examples, this step may be optional. It is further noted that any of the steps provided herein may be optional, replaced, and/or rearranged, and that the method 100 may include further steps not explicitly shown in FIG. 1. Merely by way of example, after performing the first quality check, the method 100 may include automatically scheduling/prompting, at the central server, or as an external and separate process, a chartered accountant for input relating to a second quality check. The second quality check may be configured to identify any training needed for at least one of the FTF and the QC consultant. In another aspect, the second quality check may review the field data for inconsistencies in a same, similar, or different approach as the first quality check. In yet another example, the second quality check may further be configured to identify any training that may be required for an agent at the agent location. The chartered accountant may view an electronic form that is recorded online on the central server and/or the host system, or alternatively view a physical questionnaire, whereby the form may be utilized to identify and record any issues identified by the accountant and/or store further input from the chartered accountant. It is contemplated that such forms may be subsequently provided to the MSB's host system for further evaluation.

In another aspect, FIG. 1 shows that the method 100 may include assigning and/or performing a third quality check (step 112) for the review. The third quality check may include a comparison of the review conducted, and/or more specifically the field-visit data collected, to a previous review that was conducted by the same FTF and/or by a different FTF. In some aspects, the third quality check may be automated by the central server and/or by the MSB host system. Such comparisons may aid in the identification of any inconsistencies between reviews and/or validate the currently captured field-visit data. In some aspects, comparing the field-visit data to previously collected field-visit data may not only uncover inconsistencies, but also be utilized for analyzing improvements and/or effects of any changes implemented at the agent location since the last review. In one example, the central server and/or the host system periodically assigns a percentage of incoming reviews for a third quality check. Merely by way of example, approximately 10% of review cases every month may be reviewed by supervisors or other independent FTF at the third party vendor and/or the MSB, whereby the supervisors or other independent FTF review the data collected by the FTF and/or in other quality checks, which are stored at the central server and/or host system. The supervisors may analyze results of the quality checks and/or field visit data by matching them to previous quality checks and/or field visit data in order to identify any deficiencies and/or changes in the review. Other methods for confirming the reviews and/or quality checks may be possible.

Referring again to FIG. 1, the method 100 may include recording the review (step 114). For instance, information from the review may be recorded at the central server and/or at the host system. Such information may include digital photograph(s), geographic coordinate(s), field data collected during the review, input relating to the first quality check, input relating to the second quality check, input relating to the third quality check, and so on. Such records may provide electronic documentation of the review conducted for the agent location. In another aspect, the central server and/or the host system may generate a score indicating a successful completion of the review. The score may be determined based on any of combination or piece of information related to the review. For example, the score may be based on the first quality check being successfully completed. The score may indicate successful completion of the review and mark that the review is closed. In another aspect, a successful score may permit the FTF to proceed in the routing to review a different agent location.

Still, in another aspect of FIG. 1, the method 100 may include sending the review to the host system of the MSB (step 116). For example, the central server may transmit the information from the review to the host system corresponding to the MSB. The host system may analyze the information from the review to determine a subsequent action item for the agent location and/or for the third party vendor. Such subsequent action items may include implementing an agent employee training protocol, whereby the agent employee training protocol is selected by the MSB to address any non-compliances predicted by the field-data obtained in the questionnaire. Other action items may comprise further instructions and/or training for the staff at the third party vendor, including the FTF, the QC consultant, the chartered accountant, and/or other members. For example, the central server may receive feedback directed to a FTF training action from a host system of the MSB. The feedback may be based at least in part on the information from the review. The central server may further notify the FTF via the mobile device of the FTF regarding the feedback, and/or provide the FTF training action. In some cases, such training actions may be identified and implemented promptly prior to the FTF continuing to a next location for review.

Other steps may be possible. For example, MSB and/or third party vendor may verify or re-verify the agent location as a fourth quality check. As a fourth quality check, the host system and/or central server may confirm that the FTF and/or the agent is at the correct agent location according to sampling data collected at the review and/or to a money transfer control number ("MTCN"), or other unique transaction reference number, that is collected at the agent location during the initial review. Such data may be collected by the mobile device via the mobile application and made available to the host system and/or the third party vendor. In one example, the MSB host system retrieves MTCNs from various reviews on a regular basis, such as weekly or monthly basis, and maps the agent locations associated with the MTCNs to confirm if the FTF and/or the agent are actually at the correct location during the review. In a different aspect, the MSB host system may collect the geographic coordinates from the review(s) to generate a mapping of agent locations. For instance, the geographic coordinates may be provided to a marketing operations team of the MSB, which may utilize the data to help customers identify an agent location closest to their location, work place, residence, or place of stay, or which is otherwise convenient to access. Such mapping and/or data may be searchable and provided on a website of the MSB.

Figure 2:
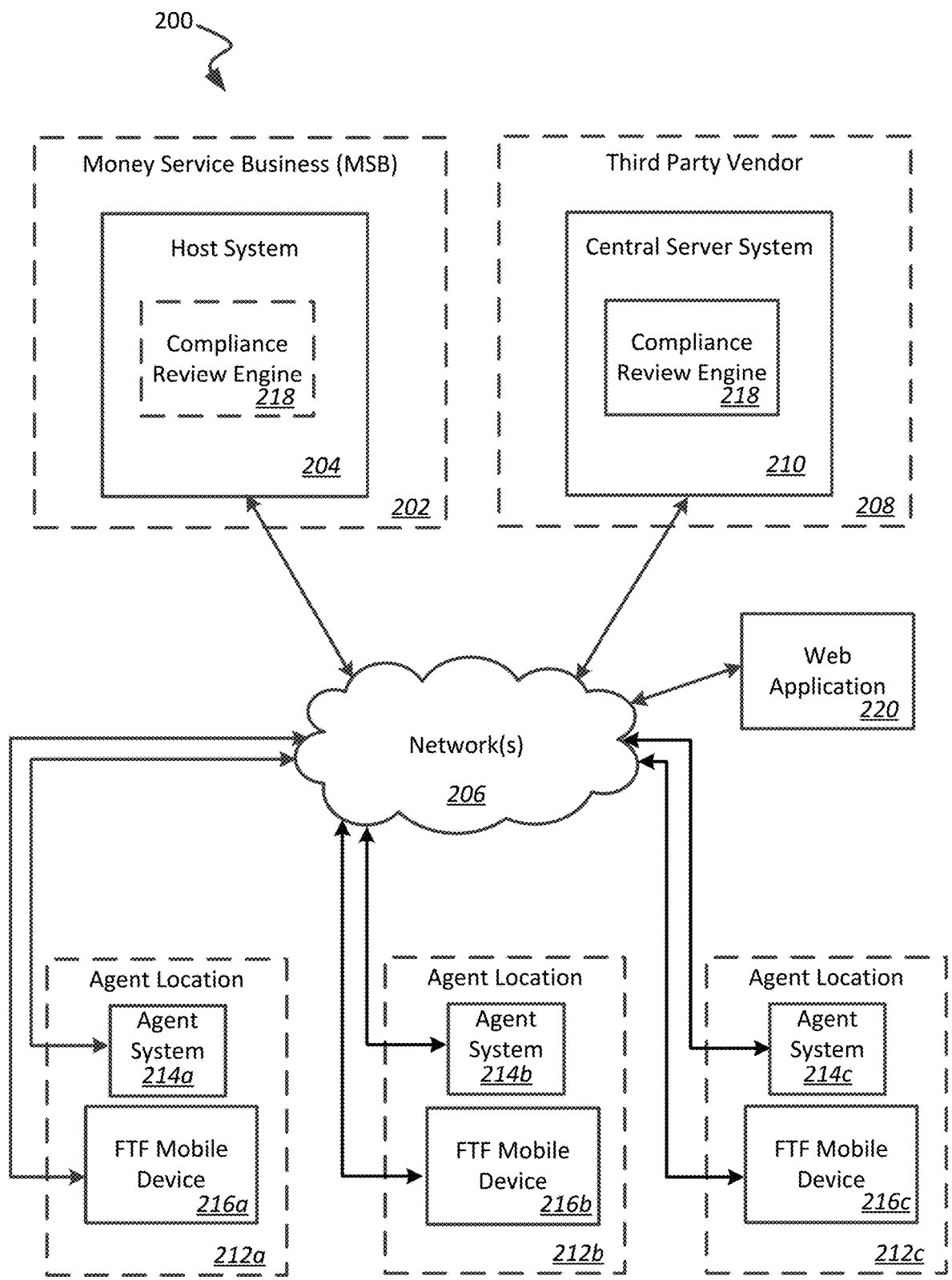
FIG. 2 shows an example system for identifying and mitigating risks relating to non-compliances.

Turning now to FIG. 2, a block diagram of an example system 200 in which all or portions of the method 100 may be implemented is shown. The example system 200 may include a money transfer provider or a MSB 202 having a host system 204, such as a system operated by WESTERN UNION or another money transfer provider service that may be capable of performing a variety of consumer-based money transfer transactions from payers (senders) to payees (recipients). Merely by way of example, the MSB 202 may facilitate wire transfers and bill payment transactions, among other products and services that may be provided.

It is noted that the MSB 202 may be in operative communication with various source and destination accounts (not shown) of senders and payers, respectively, to allow for money transfer transactions to occur. The MSB 202 may maintain, control, and/or otherwise manipulate such accounts. Merely by way of example, the source account may be any of a variety of accounts, such as a traditional bank account provided for by a financial institution. In another example, the source account may be a virtual (or e-money) wallet which may be provided for by a mobile operator or agent. Similarly, the destination account may be any of a variety of accounts, such as a bank or virtual (e-money) account, and a destination account provider may be a financial institution, mobile operator, or agent accordingly. In other examples, products and services of the MSB 202 may be provided via various agent and representative locations. For instance, a recipient of a money transfer may receive the transferred money in cash at a regular agent location. Such agents may comprise an individual, group, retail location, or other entity that allows customers to access services of the MSB 202. Generally speaking and as understood by one skilled in the art, the MSB 202 may access a source account of one account provider and/or a destination account of the same or a different account provider to affect a transfer from and/or to the accounts. Such transfer may be completed via a financial transfer network, which may be one of the networks represented by network 206.

The MSB 202, and/or more particularly the host system 204 thereof, may be communicatively coupled to one or more networks 206, such as a wireless communications network, a financial transaction network, the Internet, a cellular network, and the like. Also communicatively coupled with one or more of the networks 206 may be one or more third party vendors 208 that are appointed or otherwise utilized by the MSB 202 for facilitating compliance reviews of agent locations. In one example, the network 206 comprises a cellular network for data and/or phone communication between the host system 204 and the central server system 210. Although a single third party vendor 208 is shown, it is noted that the MSB 202 may utilize a plurality of third party vendors 208, whereby each third party vendor may include a central server system 210.

The host system 204 and/or the central server 210 may further be communicatively coupled to a plurality of agent locations 212*a,b,c* via one or more networks 206. Each agent location 212*a,b,c* may be geographically dispersed and/or located remotely from one another, as well as from the central server 210 and the host system 204. As described above, the agent locations 212*a,b,c* may form a network for the MSB 202 in which products and services of the MSB 202 are distributed there-through. Although only three agent locations 212*a,b,c* are shown for simplicity, numerous agent locations may be operatively connected to the host system 204 and/or the central server system 210 via one or more different types of networks 206. Merely by way of example, the MSB 202 may operate through a network of hundreds of thousands of agent locations.

Each agent location 212*a,b,c* may include an agent system 214*a,b,c*, such as a computer system that is operatively connected to one or more networks 206. In one example, the agent system 214*a,b,c* is operatively connected to a cellular network for data and/or phone communication with the host system 204 and/or the central server system 210. As further shown in FIG. 2, a FTF mobile device 216*a,b,c* (or any mobile device) such as a mobile phone and/or tablet, may be located at the agent location 212*a,b,c* while a review is taking place, e.g. when a FTF is located at the agent location 212*a,b,c* while conducting a review. It is noted that although a single FTF mobile device 216*a,b,c* is shown for each agent location 212*a,b,c*, any number of FTF mobile devices 216*a,b,c* may be located on the premises of each agent location 212*a,b,c*. FTF or other staff may be assigned a single device, and may be used at different locations for different reviews. Each FTF mobile device 216*a,b,c* may provide, among other hardware and software elements, a mobile application that is configured to conduct reviews, such as a proprietary compliance review mobile application that is created, modified, and/or otherwise generated by the MSB 202 and/or the central server 210. Each FTF mobile device 216*a,b,c* may be operatively connected to the host system 204 and/or the central server system 210 via one or more wireless communications networks 206 to permit sending and/or receiving data, such as field-visit data, phone calls, and the like. Further, it is noted that although not explicitly shown, the FTF mobile device 216*a,b,c* may be in operative communication with any other FTF mobile devices and/or agent location systems 214*a,b,c*.

As further shown in FIG. 2, a compliance review engine 218 may be provided at the central server system 210 and/or the host system 204. In some examples, the compliance review engine 218 may communicate with the FTF mobile device 216*a,b,c* and/or more specifically, the compliance review mobile applications provided thereon, to conduct various steps of the review process as exemplified in the method 100. For instance, the compliance review engine 218 may initiate and/or otherwise participate in receiving review data from the FTF mobile devices 216*a,b,c* and/or performing various quality checks as discussed above.

It should be understood by one having ordinary skill in the art that the communicative links shown in FIG. 2 may include additional communication networks and/or conduits. Communication channels may exist that are not explicitly shown. Further, communications interfaces may be provided through a variety of means, which can include non-mobile networks, such as fiber-optic, coaxial cable, and/or other hard-wired means. It will be understood by one having ordinary skill in the art that the system 200 represents some embodiments of the invention, and that the invention allows for a variety of other configurations.

Referring back to the compliance review mobile application of the FTF mobile device 216*a,b,c* in FIG. 2, in some examples, the mobile application comprises an Android application that is utilized on an Android-supporting phone and/or tablet. The compliance review mobile application may serve as a mechanism for real-time quality checks and/or follow-up actions. It is contemplated that the compliance review mobile application provides the questionnaire for collecting field-visit data. The questionnaire may be formatted per jurisdictional and/or country requirements. Further, the questionnaire may include a built-in scoring matrix and/or escalation grid to aid in deciding any follow-up actions that should be pursued. Further, as described previously, the mobile application may geo-tag FTF visits of the agent location 212*a,b,c* to mark attendance of the FTF online, at the correct agent location, and track FTF movements. Any data collected by the mobile application may be submitted to the central server 210 and/or the host system 204 upon pressing a submission button, or soft key, on an interface of the mobile application.

Alternatively and/or additionally, a web application may be provided, such as by the central server 210 and/or the host system 204 to facilitate capture of data in situations where the FTF mobile device 216*a,b,c* is unavailable, down, and/or damaged. In that case, the web application 220 may comprise a webpage that is accessible via a laptop or a computer. In a different example, the mobile application may provide offline capture of field-visit data, whereby any collected information is retained by the FTF mobile device 216a,b,c in case there is a system/network outage. Data security measures, such as encryption, decryption, encoding, and decoding schemes, may be implemented to facilitate the safe retention of the collected information. In a different aspect, the mobile application may include multiple questionnaire formats with independent scoring mechanisms.

Figure 3:
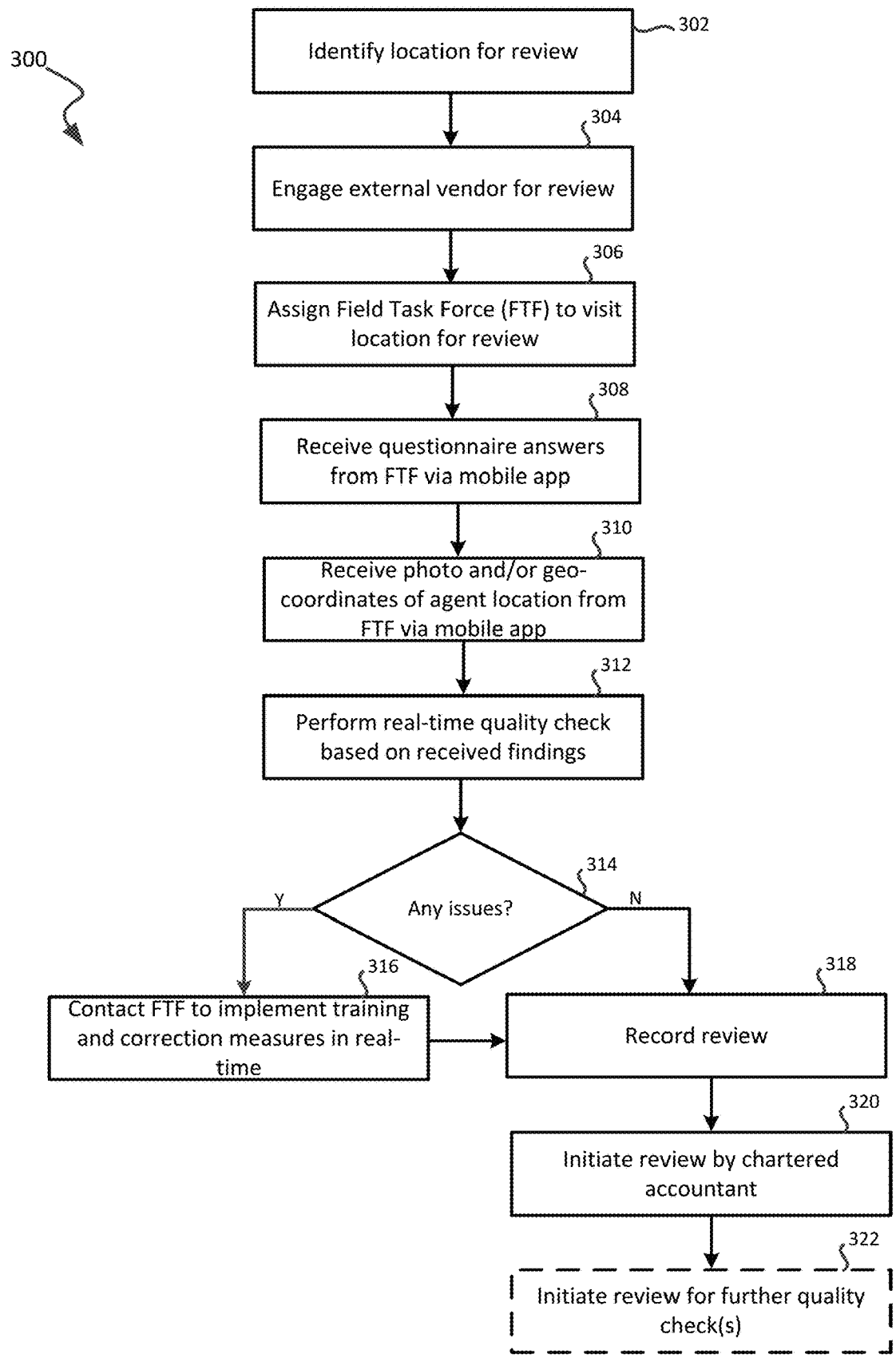
FIG. 3 shows another example method for identifying and mitigating risks relating to non-compliances.

Turning now to FIG. 3, a flow chart is shown illustrating another example method 300 for identifying and mitigating risks relating to AML/KYC non-compliances. The method 300 may be performed by the central server of the third party vendor in operative communication with a FTF mobile device and/or a MSB host system. The method 300 may include identifying an agent location for review (step 302) and/or engaging an external vendor for reviewing the agent location (step 304). In one example, steps 302 and 304 are performed by the MSB host system. The method 300 may further include assigning a FTF to visit the agent location for review. For example, the third party vendor may select the FTF for reviewing the agent location. It is noted that although a single agent location is being described herein, a plurality of agent locations may be identified and/or assigned to a single FTF, and/or a plurality of FTFs, and evaluated for review following the method 300.

The method 300 may further include receiving data collected during the review by the deployed FTF. For instance, the central server of the external vendor may receive responses entered in an objective questionnaire that is provided on a mobile application of a mobile device of the FTF, as described in the foregoing paragraphs (step 308). The central server may also receive digital photograph(s) and/or geographic coordinates relating to the agent location, as captured by the mobile application (step 310). Such data may also be sent by the FTF mobile application to the host system of the MSB.

Upon receiving the data, the central server and/or the host system may queue up the data for review by a Quality Check (QC) consultant to perform one or more real-time quality checks for the review conducted at the agent location (step 312). If any issue are identified (step 314), the QC consultant accessing the central server and/or the host system data may contact the FTF (step 316) immediately to implement any necessary training that is based on determinations from the quality check(s) and/or to implement any corrective measures to the agent location in real-time. Upon contacting the FTF and successfully addressing the issues identified, or if no issues are identified with the review, the review may be recorded at the central server and/or the host system (step 318). In another example, the review may be scored and/or marked as successfully completed to close a real-time portion of the quality check, such as upon completion of the first quality check. In other examples, the review is not marked as successfully completed until subsequent quality checks are performed.

As shown in the method 300, further quality checks may include, and are not limited to, a review by a chartered accountant. For instance, the central server of the third party vendor may initiate the quality check by the chartered accountant (step 320). If the review and/or first quality check results are recorded at the central server, the central server may transmit and/or otherwise provide access to the information for the chartered accountant. The chartered accountant may ensure, among other tasks, that the third party vendor system is operating properly, identify any training that may be needed for the FTF and/or QC consultants of the third party vendor system, among other responsibilities. In another example, the central server initiates further quality check(s) (step 322) for the review. Such quality checks may include, but are not limited to, periodic comparisons of the current review to previous reviews of the agent location, flagging the review for further quality checks to be performed by the MSB host system, and other possibilities.

In practice, it is contemplated that the above method 300 may facilitate the review process for compliance issues in a number of ways, such as providing a method for the MSB to validate the visits in real-time to ensure that the external vendor is providing a quality review service. For instance, the mobile application may geo-tag the field-visit data and/or the digital photograph(s) in order to mark an attendance of the FTF as being online, being located at the correct agent location, and for tracking FTF movements along an assigned route. Such geo-tags may be used in similar manners to validate subsequent visits. In another aspect, one or more digital photographs are taken via the mobile application and transmitted along with the review information to confirm visits. In other aspects, confirmation of training imparted by the FTF and/or otherwise received by an agent at the agent location may be provided via a seal that is affixed to a physical and/or electronic data, whereby the seal may confirm that the FTF visited the correct location. As another measure for verifying the reviews, the third party vendor may include supervisors that separately review a small percentage of cases that are randomly selected in order to match the responses of the quality check(s) with previous responses from previous quality check(s) to identify any deficiencies. In other examples, unique transaction reference numbers may be collected during visits by the FTF. Such reference numbers may be utilized by the MSB to validate whether the FTF visited the correct location, and may be conducted online or externally. It is noted that any of these validation procedures may be performed by the MSB host system and/or the third party vendor central server.

To expand further on the location review process of method 300, it is noted that the MSB host system may utilize a volume risk-based matrix to identify which agent locations should be assigned for review by the third party vendor. The volume risk-based matrix may consider a volume of products and services being offered through a particular agent location, and/or a risk level for the particular agent location. Such risk levels may be obtained from previous reviews and/or quality checks associated with the agent location, and/or triggers or flags arising from recent activity at the agent location. Other examples are possible. The identified agent locations for review may be provided to the external vendor that determines a routing and list of locations that may be covered by the FTF.

It is further noted that the mobile application utilized by the FTF may provide the FTF with details from a previous review performed by the FTF, and/or performed at the agent location being investigated. Such capabilities may aid in confirming if previous issues have been addressed. A case history may also be provided via the mobile application for similar purposes. In another aspect, the mobile application, and/or the mobile device itself, may initiate and/or receive real-time emails or messages. Merely by way of example, the external vendor, via the central server, may initiate real-time messages to alert or update agents at the agent location and/or in-house staff at the MSB. In an aspect, the real-time operations of the mobile application may serve as an agent verification tool that facilitates in tracking a physical location and/or responsiveness of an agent at the agent location.

Figure 4:
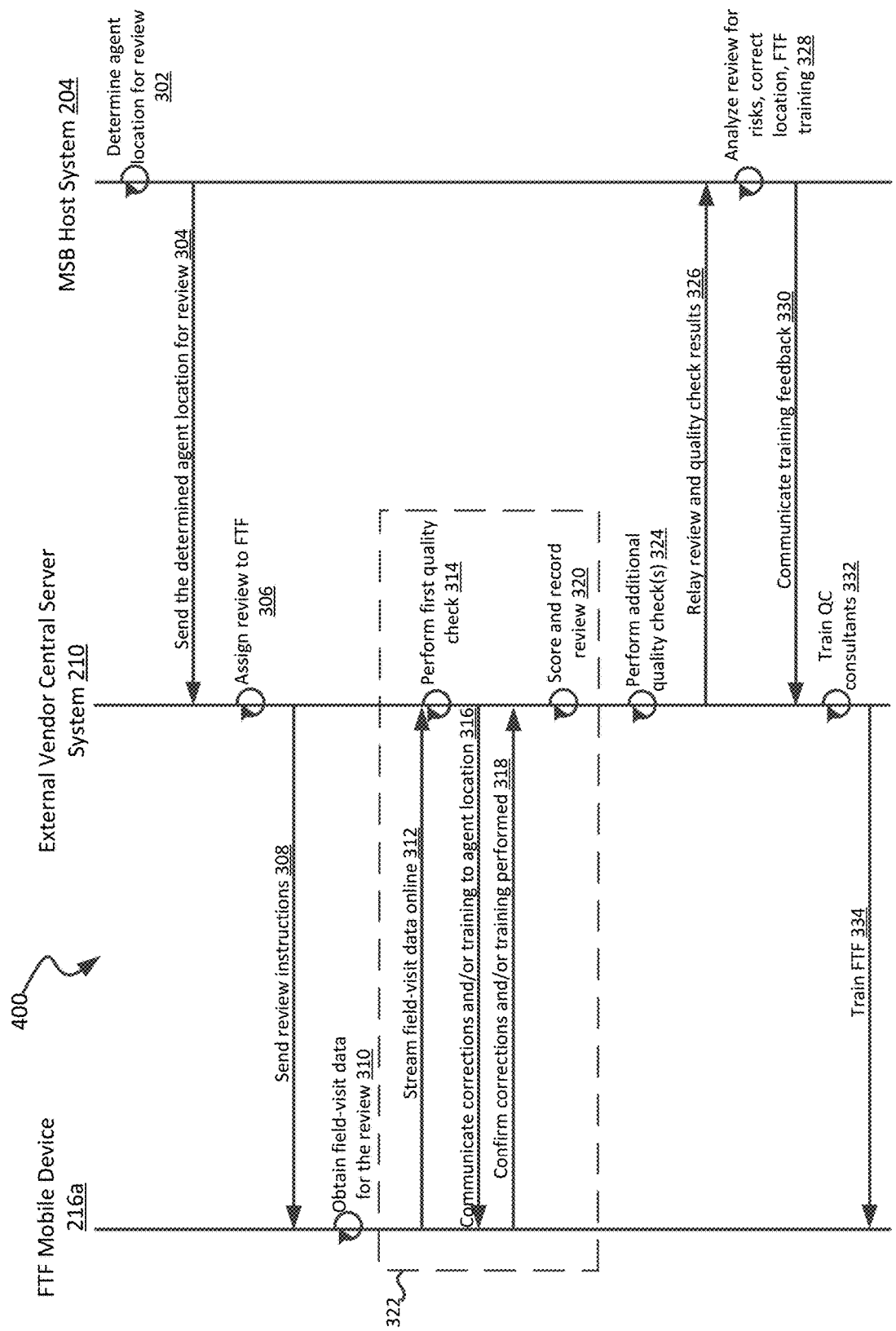
FIG. 4 shows an example communications sequence for identifying and mitigating risks relating to non-compliances.

Turning to FIG. 4, an example communications sequence 400 for the system 200 of FIG. 2 is provided. Specifically, the communications sequence 400 illustrates a possible approach for conducting a review on an agent location according to various embodiments of the present disclosure. The FTF mobile device 216a the external vendor central server 210, and the MSB host system 204 are illustrated. It is noted that other sequences and/or steps may be included, alternatively and/or additionally, to the sequence 400. It is also noted that the specific FTF mobile device 216a is shown merely for example purposes, and that any FTF mobile device may be utilized. Further, some or all of the steps may be partially and/or fully automated, and/or involve manual input.

As shown in the sequence 400, the host system 204 may determine an agent location for review (302). Upon determining the agent location for review, the host system 204 may send the determined agent location to the central server 210 (304) of the appointed external vendor, or by some other communication. In some examples, a plurality of agent locations are identified for review and sent to the external vendor. The external vendor may assign the review for each agent location to one or more FTF (306) and send corresponding review instructions (308) to the FTF mobile device 216a,b,c. Such review instructions may include details such as a time and date for conducting the review, the agent location to be reviewed, and/or other details, including the address of the location, that may be uploaded to the mobile device 216a, and/or more particularly the mobile application on the mobile device for conducting the review. It is contemplated that such data may be electronically transmitted via a wireless network, such as a cellular communications network. In some cases, the FTF mobile device 216a may send, per request by the central server 210, confirmation that the review instructions have been received and understood.

Subsequently, the FTF may take the FTF mobile device on-site to the agent location to obtain field-visit data for the review (310). For instance, the field-visit data may be captured on the mobile application via a questionnaire format, and/or a physical form. In some examples, the mobile application may not allow the questionnaire to be accessible on the mobile device 216a until the mobile application determines, based on geographic coordinates identified by the mobile device 216a, that the FTF mobile device is physically at the agent location. Upon completing the questionnaire, the FTF may scan a copy of the physical form, if any, via the mobile application, and/or take a photograph of the location via the mobile application. The mobile application may further geo-tag the photograph. The mobile application may provide a submission button that when activated by the FTF begins streaming the collected field-visit data to the external vendor server 210 (312).

Upon receiving the streamed field-visit data at the central server 210, a series of quality checks may be performed. A first quality check may be performed (314) by a QC consultant that reviews the information captured in the review and searches for any inconsistencies in the information. Such inconsistencies may include inconsistent responses for various questions that are interlinked in the questionnaire, geographic coordinates that do not match with known geographic coordinates of the agent location, a digital photograph quality and/or error, and so on. Other examples are possible. Upon identifying any inconsistencies, the QC consultant, via phone or the central server 210, may contact the FTF, via the mobile device 216a, to make corrections, seek clarification, and/or provide any training (316). In some cases, any changes made by the QC consultant may be recorded in an audit log at the central server 210. In other cases, the QC consultant may require a new review to be performed by the FTF. The mobile device 216a may provide confirmation that the corrections and/or training is performed, for instance in a back-and-forth relay over telephonic communications, emails, messages, and/or other communications sent directly via the mobile application. Once all of the identified issues have been addressed, the review may be scored as successful and/or unsuccessful, and/or various levels thereof, and then recorded at the central server 210 (320), and/or closed. In some examples, the review remains open until the QC consultant finishes reviewing the submission under the first quality check. The FTF may be granted permission, upon closing the review, to continue to other agent locations to conduct other reviews.

As illustrated in FIG. 4, in the present example, sequences included within a dashed territory 322 are performed in real-time, without significant lag. Real-time access to information is provided to allow for quick decision-making and/or analysis, thereby preventing or mitigating possible risks associated with non-compliances that are identified by the review. To consider another aspect, such processes also ensure data integrity since once saved at 320, no changes are possible by the FTF and therefore the likelihood of any possible collusion between the FTF and the agent location staff is reduced. It is noted that other sequences may be performed in real-time as well.

Further shown in sequence 400, central server 210 may continue performing various quality checks on the review after it is closed (324). Such quality checks may include any of the quality checks identified above, such as those performed by a chartered accountant that validates the review of the FTF, and/or reviews performed by supervisors for consistency with previously conducted reviews. The review and/or quality check(s) may be transmitted to the MSB host system 204 (326), which may then analyze the review for any risks, whether a correct agent location was visited, and/or determine any further training that the FTF and/or QC consultant may benefit from (328). The host system 204 may communicate such feedback, such as training feedback (330) to the central server 210. In response, the central server 210 and/or other entity may provide the training stipulated by the MSB to the QC consultant(s) (332) and/or to the FTF (334).

Figure 5:
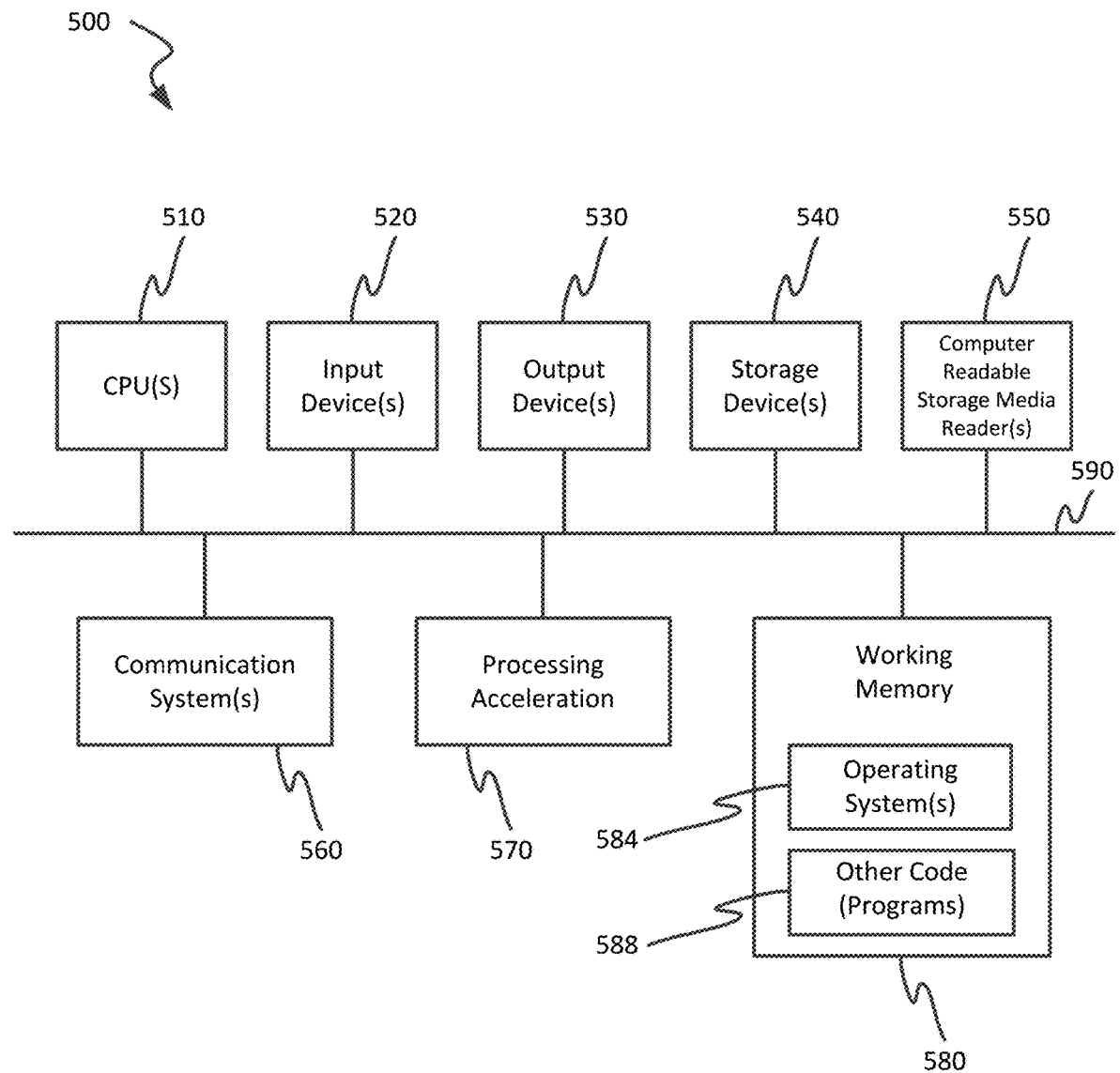
FIG. 5 shows an example computer architecture upon which various aspects of the present invention may be implemented.

Turning now to FIG. 5, a block diagram is shown illustrating a computer system upon which embodiments of the present invention may be implemented. This example illustrates a computer system 500 which as may be used, in whole, in part, or with various modifications, to provide the functions of the FTF mobile device 216a,b,c, mobile application, agent system 214a,b,c, central server 210, host system 204, compliance review engine 218, and/or other components and features of the invention such as those discussed in FIGS. 1-4.

The computer system 500 is shown comprising hardware elements that may be electrically coupled via a bus 590. The hardware elements may include one or more central processing units 510, one or more input devices 520 (e.g., a mouse, a keyboard, etc.), and one or more output devices 530 (e.g., a display device, a printer, etc.). The computer system 500 may also include one or more storage device 540. By way of example, storage device(s) 540 may be disk drives, optical storage devices, solid-state storage device such as a random access memory ("RAM") and/or a read-only memory ("ROM"), which can be programmable, flash-updateable and/or the like.

The computer system 500 may additionally include a computer-readable storage media reader 550, a communications system 560 (e.g., a modem, a network card (wireless or wired), an infra-red communication device, Bluetooth™ device, cellular communication device, etc.), and working memory 580, which may include RAM and ROM devices as described above. In some embodiments, the computer system 500 may also include a processing acceleration unit 570, which can include a digital signal processor, a special-purpose processor and/or the like.

The computer-readable storage media reader 550 can further be connected to a computer-readable storage medium, together (and, optionally, in combination with storage device(s) 540) comprehensively representing remote, local, fixed, and/or removable storage devices plus storage media for temporarily and/or more permanently containing computer-readable information. The communications system 560 may permit data to be exchanged with a network, system, computer and/or other component described above.

The computer system 500 may also comprise software elements, shown as being currently located within a working memory 580, including an operating system 584 and/or other code 588. It should be appreciated that alternate embodiments of a computer system 500 may have numerous variations from that described above. For example, customized hardware might also be used and/or particular elements might be implemented in hardware, software (including portable software, such as applets), or both. Furthermore, connection to other computing devices such as network input/output and data acquisition devices may also occur.

Software of computer system 500 may include code 588 for implementing any or all of the function of the various elements of the architecture as described herein. For example, software, stored on and/or executed by a computer system such as system 500, can provide the functions of any of the print function applet, and/or other components of the invention such as those discussed above.

Figure 6:
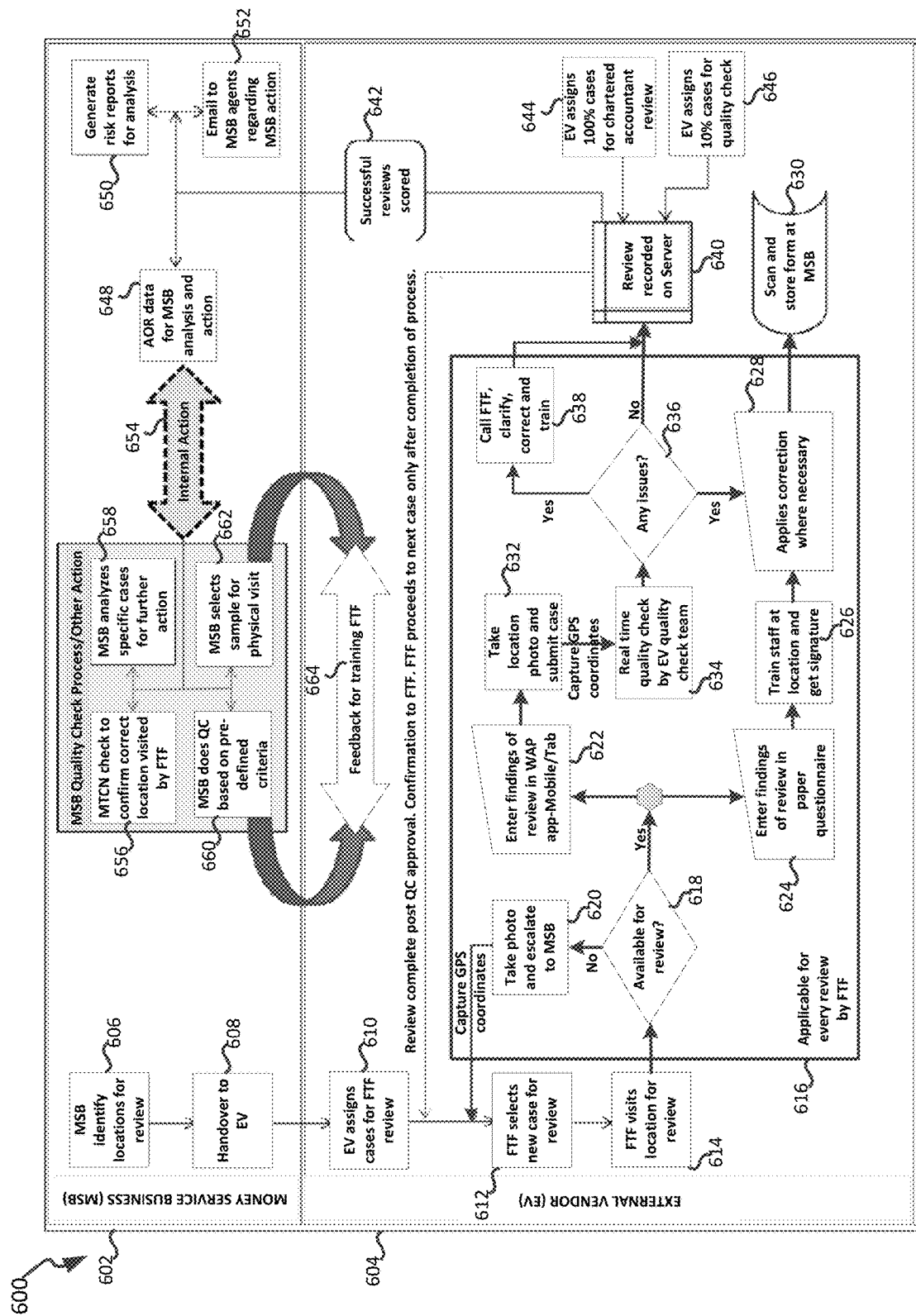
FIG. 6 shows another example method for identifying and mitigating risks relating to non-compliances.

Turning now to FIG. 6, a block diagram illustrating an example procedural flow 600 for an agent oversight program directed to identifying and mitigating risks relating to AML/KYC non-compliances is illustrated. The flow 600 includes steps that are performed by the MSB 602 and the external vendor 604, and communications there-between. As shown, the MSB may identify agent locations for review (step 606) and handover, or otherwise electronically transmit, the locations to the appointed external vendor (step 608). The external vendor may assign the identified agent locations for its FTF to review (step 610). The FTF may select or otherwise initiate the review of the agent location (step 612) by first visiting the agent location (step 614) with an Android-based mobile device. Using the mobile device, the FTF may perform the review according to various steps highlighted in box 616.

The FTF may determine if the agent location is available for review (step 618), e.g. the agent location is open and operating rather than closed. If the agent location is not available, the FTF may take a photograph of the agent location using the mobile application and/or escalate the case to the MSB (620). For instance, a notification may be sent from the mobile application to the central server of the external vendor and/or the MSB indicating the escalation. The mobile device may further capture geo-coordinates as verification that the FTF has assessed the correct agent location. In some cases, escalating the case may flag the agent location and set up a reminder in the mobile application for the FTF to reschedule its visit for a later date. It is contemplated that the agent location is not typically informed of the FTF visiting dates, though it is likely in some such cases the FTF may agree upon a time/date to ensure a review is completed. In some cases, the reason for closure could trigger other actions (for example suspension of the location by the MSB, etc.).

The FTF may determine that the agent location is available for review, and proceed to conduct the review. The FTF may enter findings into the mobile application (step 622) and/or enter the findings into a paper questionnaire (step 624). The FTF may further train the staff at the agent location and get a physical signature (step 626) on the paper questionnaire from the staff as verification that training was performed and/or evaluation was completed. If any issues are identified by the FTF, such as inconsistent answers in the questionnaire, the issues may be addressed (step 628) on-site. The physical questionnaire may be scanned and stored at the central server and/or at the MSB (step 630). In some cases, the mobile application scans, stores, and transmits the physical form to the central server and/or the MSB host system accordingly.

Additionally and/or alternatively, the findings may be entered in a mobile application provided on the mobile device or tablet of the FTF (step 622). After filling out the questionnaire, the FTF may use the mobile application to take a digital photograph of the agent location (step 632), capture the geo-coordinates of the agent location, and stream the information to the central server of the third party vendor for review. In some examples, the geographic coordinates are captured upon submission of the information to the central server, e.g. upon pressing a submit button in the mobile application, to possibly verify that the FTF has not yet left the agent location prior to closing the case. The central server may receive the streamed information in real-time and initiate a quality check, such as a first quality check by a QC consultant or a team thereof (step 634). If any issues are identified (step 636), the issues may be immediately addressed by the team by calling the FTF, clarifying with the FTF, and/or training the FTF (step 638). Once the issues are addressed, or if there are no issues identified in the quality check of the review, the review and/or quality check results may be recorded on the central server (step 640). The successful reviews may be scored (step 642) and closed to permit the FTF to proceed to a next agent location. Unsuccessful reviews may be marked as unsuccessful and remain open until all identified issues are resolved. It is contemplated that any reviews recorded on the server may be pulled by the MSB at any time to evaluate any further actions (such as training the agent location on specific aspects of a particular question that has been marked as a defect).

The external vendor may perform additional quality checks, such as assigning the cases for review by a chartered accountant (step 644), which may identify any training needed for the FTF that conducted the agent location review and/or the QC consultant(s) that performed the first quality check. In another example, the external vendor may assign a portion of the cases, such as 10% of the cases, for an additional quality check (step 646). Such quality checks may include/allow, merely by way of example, comparing the review with previous reviews to identify any inconsistencies and/or changes therewith.

As shown in FIG. 6, the MSB may utilize the successful reviews obtained from the central server of the external vendor for further compliance-related analysis and/or actions (step 648), such as generating risk reports for further analysis (step 650) and/or emailing in-house staff and/or agents of determined actions to be implemented (step 652). In another aspect, the MSB may utilize the data collected in the review for various internal actions (step 654), which may include quality checks, among others. Merely by way of example, the MSB may utilize an MTCN collected during the review to confirm if the correct agent location was visited (step 656). The MSB may analyze specific reviews for further actions (step 658). The MSB may perform additional quality checks based on pre-defined criteria (step 660). Further, the MSB may select agent locations for physical visits by the MSB in-house staff (step 662). In another aspect, the MSB may utilize the reviews to validate address and contact numbers of agent locations for correctness. Based on the various analysis processes performed at the MSB, the MSB may determine and provide feedback for training the FTF of the third party vendor (step 664) in preparation for future visits. It is noted that some agent locations may be reviewed once in a quarter, twice annually, once per year, and/or at other frequencies, which may be changed based on the review(s) and quality checks and/or of the assessed risk of the specific locations. In some examples where agent locations are reviewed only once annually, if the systems and methods disclosed herein predict that the agent location is in a high risk category, the MSB may determine to re-review the location a month later or at a greater frequency. Other examples are possible.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

What is claimed is:

1. A method for controlling agent systems in remote locations, the method comprising:
  receiving, by a server system comprising one or more processors, an indication of an agent system communicatively coupled to the server system via one or more networks and initiating an evaluation process corresponding to the agent system, and responsive to the received indication of the agent system:
  determining, by the server system, a location corresponding to the agent system based at least in part on the received indication of the agent system, and, based at least in part on the location corresponding to the agent system, identifying, by the server system, a selected set of rules particularized to the location from a plurality of sets of rules particularized to a plurality of locations;
  based at least in part on the selected set of rules particularized to the location, configuring, by the server system, specifications of content items and formatting of interface elements to conform to the selected set of rules particularized to the location;
  remotely directing in real time, by the server system, operations corresponding to the agent system to comply with the selected set of rules particularized to the location at least in part by initiating a session with a mobile device wirelessly connected to the server system via the one or more networks;
  within the session:
    transmitting, by the server system, a wireless signal to the mobile device while the session with the mobile device is taking place, the wireless signal activating a camera feature of a mobile application on the mobile device to capture a first digital photograph associated with a geographic coordinate through a global positioning system (GPS) at the location during the session;
    generating, by the server system, a mapping of geographic coordinates based at least in part on a first plurality of geographic coordinates received from the mobile application, wherein each of the first plurality of geographic coordinates correspond to a first location where the first digital photograph was captured during the session and each of the first plurality of geographic coordinates are associated with a first time;
    initiating, by the server system, a data retrieval process to retrieve field data from the mobile device at least partially by transmitting the specifications of the content items and the formatted interface elements to the mobile device, the data retrieval process comprising real-time evaluation of input and selecting one or more content items and one or more corresponding interface elements during the data retrieval process based at least in part on the real-time evaluation;
    analyzing, by the server system, a set of data collected by the server system, the set of data comprising the first digital photograph, the first plurality of geographic coordinates, and the field data, and, based at least in part on the analyzing, determining one or more subsequent actions for performance with respect to the agent system;
    based at least in part on a set of collected data comprising the first digital photograph, the first plurality of geographic coordinates, and the field data, causing, by the server system, the one or more subsequent actions for performance with respect to the agent system;
    evaluating, by the server system, results of the one or more subsequent actions; and
    suspending or terminating, by the server system, operations of the agent system.

2. The method of claim 1, further comprises:
  receiving, by the server system, first field data from the mobile application during the session;
  responsive to the receiving the first field data, reinitiating, by the server system, the camera feature of the mobile application of the mobile device to capture a second digital photograph associated with a geographic coordinate or a second geographic coordinate through the GPS at the location during the session;

receiving, by the server system, a second digital photograph from the mobile application on the mobile device;

receiving, by the server system, second field data from the mobile application during the session;

querying, by the server system, associated memory to locate a second plurality of geographic locations associated with a second location, the second plurality of geographic locations being associated with a second time, the second time being prior to the first time;

comparing, at the server system, a first plurality of geographic locations associated with the first location to the second plurality of geographic locations associated with the second location to determine that the first location is the second location;

upon determining the first location is the second location, automatically prompting a graphical user interface for input relating to the first field data and the second field data.

3. The method of claim 2, comprising:

transmitting, by the server system, the first field data and the second field data to facilitate analysis of the first field data and the second field data and determining a subsequent action item for the agent system.

4. The method of claim 3, comprising:

wherein the subsequent action item comprises implementing an employee training protocol, wherein the employee training protocol is selected to address non-compliances predicted by the first field data or the second field data obtained in a questionnaire.

5. The method of claim 2, comprising:

communicating, by the server system with the mobile application on the mobile device to receive the first field data and the second field data while the mobile device is located remotely from a location of the server system.

6. The method of claim 2, comprising:

determining, by the server system, a plurality of agent systems for review;

simultaneously conducting, at the server system, a plurality of reviews for the determined agent systems; and recording, at server system, the plurality of reviews for the determined agent systems.

7. The method of claim 6, where the determining, at the server system, the plurality of agent systems for review is based on instructions that are based at least in part on risk and quality check analyses of previous reviews for the plurality of agent systems.

8. The method of claim 7, comprising:

generating, by the server system, a score indicating a successful completion of the review based on a quality check, wherein the score indicating the successful completion of the review permits review of a different agent system; and marking, by the server system, the review as closed based on the score.

9. The method of claim 2, comprising:

prompting, by the server system, the graphical user interface for the input relating to a quality check in real-time upon receiving the first digital photograph, geographic coordinates, and field data.

10. The method of claim 2, comprising:

based on the input relating to a quality check, prompting, by the server system, clarification regarding the first field data or the second field data obtained via a questionnaire, correcting the first field data or the second field data obtained via the questionnaire, and providing training according to a training protocol.

11. The method of claim 10, comprising:

wherein the prompting comprises placing a call, from the server system via a telecommunications network, to the mobile device.

12. The method of claim 10, comprising:

receiving, by the server system via a wireless communication network, a notification from the mobile application to escalate the review for the agent system, wherein the notification to escalate the review is based on a trigger identified by the mobile application; and transmitting, by the server system, a notification to cause escalating of the review, wherein escalating the review prompts subsequent actions to address the identified trigger.

13. The method of claim 10, comprising:

wherein the questionnaire comprises dichotomous questions having two possible response options, wherein the two possible response options include at least one of a yes/no response options, a true/false response options, and an agree/disagree response options.

14. The method of claim 10, comprising:

wherein the questionnaire comprises a plurality of questions, and wherein each of the plurality of questions are auto-generated in real-time by the mobile application based on responses received for preceding questions in the questionnaire.

15. The method of claim 14, comprising:

wherein each of the plurality of questions are determined based on a n objective risk matrix to predict and auto-load next questions in the questionnaire based on previous responses.

16. The method of claim 10, comprising:

wherein the questionnaire is stored at the mobile device having the mobile application such that the questionnaire is accessible with and without connectivity to a wireless communications network.

17. The method of claim 1, comprising:

assigning, by the server system, the review for a second quality check, wherein the second quality check comprises verifying, by the server system, the review with a preceding review for the agent system to identify one or more inconsistencies.

18. The method of claim 2, comprising:

receiving, by the server system, feedback directed to a training action from a host server, wherein the feedback is based at least in part on the first field data or the second field data; and notifying, by the server system, the mobile device regarding the feedback directed to the training action.

19. A system for controlling agent systems in remote locations, the system comprising:

a server system comprising one or more processors; and a memory communicatively coupled with the one or more processors and having stored therein processor-readable instructions that, when executed by the one or more processors, cause the one or more processors to perform:

receiving an indication of an agent system communicatively coupled to the server system via one or more networks and initiating an evaluation process corresponding to the agent system, and responsive to the received indication of the agent system:

determining a location corresponding to the agent system based at least in part on the received indication of the agent system, and, based at least in part on the location corresponding to the agent system, identifying a selected set of rules particularized to the location from a plurality of sets of rules particularized to a plurality of locations;

based at least in part on the selected set of rules particularized to the location, configuring specifications of content items and formatting of interface elements to conform to the selected set of rules particularized to the location;

remotely directing in real time operations corresponding to the agent system to comply with the selected set of rules particularized to the location at least in part by initiating a session with a mobile device wirelessly connected to the server system via the one or more networks;

within the session:
transmitting a wireless signal to the mobile device while the session with the mobile device is taking place, the wireless signal activating a camera feature of a mobile application on the mobile device to capture a first digital photograph associated with a geographic coordinate through a global positioning system (GPS) at the location during the session;

generating a mapping of geographic coordinates based at least in part on a first plurality of geographic coordinates received from the mobile application, wherein each of the first plurality of geographic coordinates correspond to a first location where the first digital photograph was captured during the session and each of the first plurality of geographic coordinates are associated with a first time;

initiating a data retrieval process to retrieve field data from the mobile device at least partially by transmitting the specifications of the content items and the formatted interface elements to the mobile device, the data retrieval process comprising real-time evaluation of input and selecting one or more content items and one or more corresponding interface elements during the data retrieval process based at least in part on the real-time evaluation;

analyzing a set of data collected by the server system, the set of data comprising the first digital photograph, the first plurality of geographic coordinates, and the field data, and, based at least in part on the analyzing, determining one or more subsequent actions for performance with respect to the agent system;

based at least in part on a set of collected data comprising the first digital photograph, the first plurality of geographic coordinates, and the field data, causing the one or more subsequent actions for performance with respect to the agent system;

evaluating results of the one or more subsequent actions; and suspending or terminating operations of the agent system.

20. One or more non-transitory, computer-readable media having stored thereon computer-readable instructions which, when executed by one or more processors, cause the one or more processors to perform operations comprising:

receiving an indication of an agent system communicatively coupled to the one or more processors via one or more networks and initiating an evaluation process corresponding to the agent system, and responsive to the received indication of the agent system:

determining a location corresponding to the agent system based at least in part on the received indication of the agent system, and, based at least in part on the location corresponding to the agent system, identifying a selected set of rules particularized to the location from a plurality of sets of rules particularized to a plurality of locations;

based at least in part on the selected set of rules particularized to the location, configuring specifications of content items and formatting of interface elements to conform to the selected set of rules particularized to the location;

remotely directing in real time operations corresponding to the agent system to comply with the selected set of rules particularized to the location at least in part by initiating a session with a mobile device wirelessly connected to the one or more processors via the one or more networks;

within the session:
transmitting a wireless signal to the mobile device while the session with the mobile device is taking place at the determined location, the wireless signal activating a camera feature of a mobile application on a mobile device to capture a first digital photograph associated with a geographic coordinate through a global positioning system (GPS) at the location during the session;

generating a mapping of geographic coordinates based at least in part on a first plurality of geographic coordinates received from the mobile application, wherein each of the first plurality of geographic coordinates correspond to a first location where the first digital photograph was captured during the session and each of the first plurality of geographic coordinates are associated with a first time;

initiating a data retrieval process to retrieve field data from the mobile device at least partially by transmitting the specifications of the content items and the formatted interface elements to the mobile device, the data retrieval process comprising real-time evaluation of input and selecting one or more content items and one or more corresponding interface elements during the data retrieval process based at least in part on the real-time evaluation;

analyzing a set of data collected by the one or more processors, the set of data comprising the first digital photograph, the first plurality of geographic coordinates, and the field data, and, based at least in part on the analyzing, determining one or more subsequent actions for performance with respect to the agent system;

based at least in part on a set of collected data comprising the first digital photograph, the first plurality of geographic coordinates, and the field data, causing the one or more subsequent actions for performance with respect to the agent system;

evaluating results of the one or more subsequent actions; and suspending or terminating operations of the agent system.

* * * * *

UNITED STATES PATENT AND TRADEMARK OFFICE
CERTIFICATE OF CORRECTION

| | |
|---|---|
| PATENT NO. | : 10,929,854 B2 |
| APPLICATION NO. | : 14/964290 |
| DATED | : February 23, 2021 |
| INVENTOR(S) | : Manju Rai et al. |

It is certified that error appears in the above-identified patent and that said Letters Patent is hereby corrected as shown below:

In the Claims

In Column 32, Claim 15, Line 31, please delete "a n" and insert -- an --

Signed and Sealed this
Ninth Day of November, 2021

Drew Hirshfeld
*Performing the Functions and Duties of the*
*Under Secretary of Commerce for Intellectual Property and*
*Director of the United States Patent and Trademark Office*